(12) United States Patent
Kurokawa et al.

(10) Patent No.: US 11,822,093 B2
(45) Date of Patent: Nov. 21, 2023

(54) OPTICAL MODULE

(71) Applicant: Sumitomo Electric Industries, Ltd., Osaka (JP)

(72) Inventors: Munetaka Kurokawa, Osaka (JP); Yasushi Fujimura, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 428 days.

(21) Appl. No.: 17/016,741

(22) Filed: Sep. 10, 2020

(65) Prior Publication Data

US 2021/0072445 A1    Mar. 11, 2021

(30) Foreign Application Priority Data

Sep. 11, 2019   (JP) ................. 2019-165572

(51) Int. Cl.
  *G02B 27/28*   (2006.01)
  *G02B 6/27*    (2006.01)
(52) U.S. Cl.
  CPC .......... *G02B 27/283* (2013.01); *G02B 6/2706* (2013.01); *G02B 6/2773* (2013.01)
(58) Field of Classification Search
  CPC ... G02B 27/283; G02B 6/2706; G02B 6/2773
  USPC ...................................................... 398/135
  See application file for complete search history.

(56) References Cited

U.S. PATENT DOCUMENTS

| | | | |
|---|---|---|---|
| 5,003,626 A | 3/1991 | Kuwahara et al. | |
| 6,259,529 B1* | 7/2001 | Sorin | H04B 10/64 398/9 |
| 6,441,875 B1* | 8/2002 | Wu | G02F 1/133528 349/86 |
| 7,251,076 B1 | 7/2007 | Okada et al. | |
| 7,280,770 B2* | 10/2007 | Tan | H04B 10/64 398/205 |

(Continued)

FOREIGN PATENT DOCUMENTS

| | | |
|---|---|---|
| JP | S63-019928 A | 1/1988 |
| JP | 2001-033604 A | 2/2001 |

(Continued)

OTHER PUBLICATIONS

Neda et al; Symmetric signal and local oscillator polarization diverse coherent optical receiver; Jan. 2016; Optical society of America; pp. 1-15. (Year: 2016).*

*Primary Examiner* — Amritbir K Sandhu
(74) *Attorney, Agent, or Firm* — McCarter & English, LLP; Michael A. Sartori

(57) ABSTRACT

The optical module includes an optical separating element. The optical separating element includes a birefringent material and has a first face and a second face. The first face is configured to receive a signal light and a LO light. The signal light includes a first polarized light and a second polarized light. The first polarized light travels from the first face to the second face in a first direction and is emitted from a first emission spot on the second face. The second polarized light travels from the first face to the second face in a second direction and is emitted from a second emission spot on the second face. The LO light travels from the first face to the second face in the first direction and is emitted from a LO light emission spot which is located between the first emission spot and the second emission spot.

10 Claims, 19 Drawing Sheets

(56) References Cited

U.S. PATENT DOCUMENTS

| | | | |
|---|---|---|---|
| 2002/0044732 A1 | 4/2002 | Yoon et al. | |
| 2003/0016425 A1* | 1/2003 | Tan | G02B 6/2706 398/204 |
| 2005/0259907 A1* | 11/2005 | Tan | H04B 10/614 385/11 |
| 2015/0086198 A1* | 3/2015 | Frisken | H04B 10/0795 398/25 |
| 2017/0294966 A1* | 10/2017 | Jia | H04B 10/63 |
| 2019/0212506 A1 | 7/2019 | Fujimura et al. | |
| 2019/0326995 A1* | 10/2019 | Zhou | H04J 14/02 |
| 2021/0072445 A1* | 3/2021 | Kurokawa | G02B 6/4213 |

FOREIGN PATENT DOCUMENTS

| | | |
|---|---|---|
| JP | 2002-107579 A | 4/2002 |
| JP | 2015-159191 A | 9/2015 |
| JP | 2019-120881 A | 7/2019 |

* cited by examiner

OPTICAL MODULE

CROSS-REFERENCE TO RELATED APPLICATIONS

This application is based upon and claims the benefit of priority from Japanese Patent Application No. 2019-165572, filed on 11 Sep. 2019, the entire contents of which are incorporated herein by reference.

TECHNICAL FIELD

The present disclosure relates to an optical module.

BACKGROUND

Japanese Unexamined Patent Publication No. 2001-033604 discloses an optical component which controls a light path by using a polarized light separation prism. The polarized light separation prism is formed of a material which exhibits birefringence in which light having a vibration surface parallel to a substrate and light having a vertical vibration surface perpendicular to the substrate.

Japanese Unexamined Patent Publication No. 2002-107579 discloses an optical multiplexing and demultiplexing module including a uniaxial birefringent crystal which has an incident surface on which first linearly polarized light and second linearly polarized light are incident, and an emission surface on which multiplexed light obtained by combining the first linearly polarized light and the second linearly polarized light is emitted.

Japanese Unexamined Patent Publication No. S63-019928 discloses a dual balanced polarization diversity receiver in a coherent optical communication system. The receiver includes an optical mixer which mixes received light with a local oscillation light, a polarizing beam splitter which separates mixed output light into orthogonal polarization components, and a photodetector on which the separated polarization components are incident. The polarizing beam splitter is constituted of, for example, a birefringent crystal or the like.

An optical receiving module which performs demodulation during coherent communication is required to have a function in which polarization component lights of signal lights are separated. In addition, an optical modulation module which performs modulation during coherent communication is required to have a function in which polarization component lights of signal lights are multiplexed. For example, a semiconductor element mainly formed of InP, Si or the like may be used as an element for demodulation or modulation. In such a case, an optical filter using a dielectric multilayer film is generally adopted for separating or combining the polarization component lights. At this time, a coupling optical system of an optical input part such as an optical fiber and the semiconductor element is constituted of a spatial optical system including the optical filter, a lens and the like. In a spatial optical system, an angle of propagating light is an important parameter for coupling efficiency. In a coupling optical system for coherent communication, it is required to realize high coupling efficiency and to curb a coupling efficiency difference, that is, an imbalance between two polarization component lights included in a signal light.

A multiplexer/demultiplexer called a polarizing beam splitter (PBS) or a polarizing light combiner (PBC) may be used as an optical component for separating or combining polarization component lights of signal lights. The PBS or PBC is formed of a glass component, for example. A dielectric multilayer film is provided on an optical path of signal lights in the glass component. The PBS or PBC separates or combines two polarization component lights at an angle of 90 degrees by transmitting one polarization component light and reflecting the other polarization component light in the dielectric multilayer film. A mirror is often provided on the optical path of the polarization component light reflected by the glass component. In this case, the PBS or PBC further reflects the reflected polarization component light by the mirror and adjusts a traveling direction of the polarization component light by, for example, turning back the polarization component light by 90 degrees.

In such an optical component, a manufacturing error or a mounting error may occur. In the above-described PBS or PBC, the angle of propagating light easily deviates from a design value when a manufacturing error such as an angle deviation of the dielectric multilayer film or an angle deviation of the mirror occurs. Therefore, a difference in the coupling efficiency between the two polarization component lights is easily affected by the manufacturing error. In addition, when a mounting error such as a mounting angle deviation of the glass component occurs, a beam interval between two propagating lights easily varies from a design value. Therefore, a coupling efficiency loss for each of the polarization components is easily affected by the mounting error.

SUMMARY

The present disclosure provides an optical module. The optical module includes an optical separating element and an optical waveguide element. The optical separating element includes a birefringent material. The optical separating element has a first face and a second face. The first face is configured to receive a signal light incident on the first face and a local oscillation (LO) light incident on the first face. The signal light includes a first polarized light and a second polarized light. The second polarized light has a polarized plane orthogonal to a polarized plane of the first polarized light. The LO light has a polarized plane parallel to the polarized plane of the first polarized light. The second face is configured to emit the first polarized light and the second polarized light. The first polarized light travels from the first face to the second face in a first direction and is emitted from a first emission spot on the second face. The second polarized light travels from the first face to the second face in a second direction and is emitted from a second emission spot on the second face. The second direction is inclined with respect to the first direction. The LO light travels from the first face to the second face in the first direction and is emitted from a LO light emission spot on the second face. The LO light emission spot is located between the first emission spot and the second emission spot. The optical waveguide element has a third face which faces the second face of the optical separating element. The third face has a first incident spot, a second incident spot, and a LO light incident spot. The first incident spot is optically coupled with the first emission spot of the second face. The second incident spot is optically coupled with the second emission spot of the second face. The LO light incident spot is optically coupled with the LO light emission spot of the second face. The LO light incident spot is located between the first incident spot and the second incident spot.

The present disclosure further provides another optical module. The optical module includes an optical multiplexing element and an optical modulation element. The optical multiplexing element includes a birefringent material. The optical multiplexing element has a first face and a second face. The first face is configured to emit a signal light and to receive an unmodulated light. The signal light includes a first polarized light and a second polarized light. The second polarized light has a polarized plane orthogonal to a polarized plane of the first polarized light. The unmodulated light has a polarized plane parallel to the polarized plane of the first polarized light. The second face is configured to receive the first polarized light and the second polarized light and to emit the unmodulated light. The first polarized light travels from a third incident spot on the second face to the first face in a first direction and is emitted from the first face. The second polarized light travels from a fourth incident spot on the second face to the first face in a second direction and is emitted from a position of the first face. The position overlaps the first polarized light. The second direction is inclined with respect to the first direction. The unmodulated light travels from the first face to the second face in the first direction and is emitted from an unmodulated light emission spot on the second face. The unmodulated light emission spot is located between the third incident spot and the fourth incident spot. The optical modulation element has a third face which faces the second face of the optical multiplexing element. The third face has a third emission spot, a fourth emission spot, and an unmodulated light incident spot. The third emission spot is optically coupled with the third incident spot of the second face. The fourth emission spot is optically coupled with the fourth incident spot of the second face. The unmodulated light incident spot is optically coupled with the unmodulated light emission spot of the second face. The unmodulated light incident spot is located between the third emission spot and the fourth emission spot.

DETAILED DESCRIPTION

Figure 1:
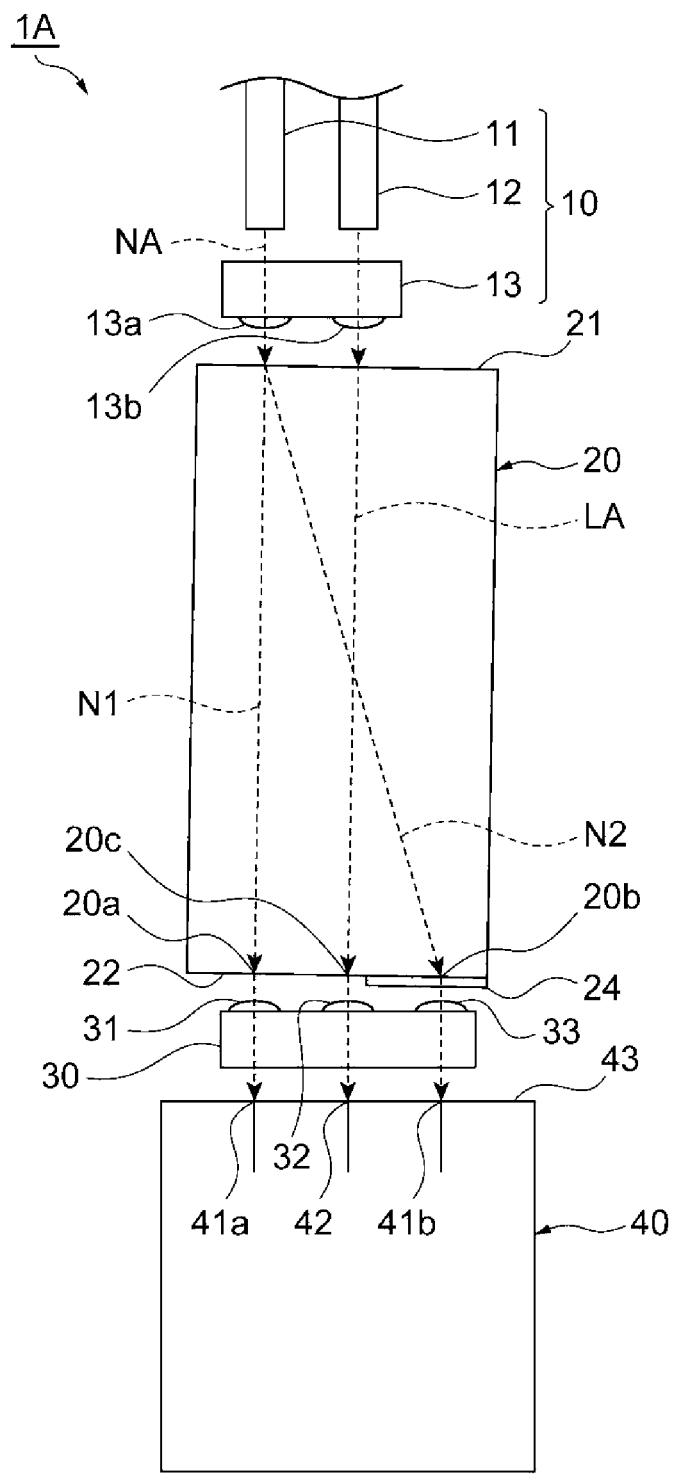
FIG. 1 is a plan view showing an outline of an optical receiving module as an optical module according to a first embodiment.

Specific examples of an optical module of the present disclosure will be described below with reference to the drawings. The present invention is not limited to the exemplifications but is defined by the scope of the claims and is intended to include meanings equivalent to the scope of the claims and all modifications within the scope. In the following description, the same elements are designated by the same reference numerals in the description of the drawings, and overlapping description will be omitted.

First Embodiment

FIG. 1 is a plan view showing an outline of an optical receiving module 1A as an optical module according to a first embodiment. The optical receiving module 1A shown in FIG. 1 is an optical receiving module for coherent communication. The optical receiving module 1A causes a phase-modulated signal light NA and a local oscillation (LO) light LA to interfere with each other and demodulates information included in the signal light NA. The demodulated information is converted into an electric signal and is output to the outside of the optical receiving module 1A. The optical receiving module 1A includes an optical input part 10 and an optical hybrid element 40. The optical hybrid element 40 is an example of an optical waveguide element in the present disclosure. The optical receiving module 1A further includes a coupling optical system which optically couples the optical input part 10 with the optical hybrid element 40. The signal light NA is separated by polarization in the coupling optical system and then guided to the optical hybrid element 40.

The optical hybrid element 40 is a semiconductor device of which a main constituent material is, for example, InP, Si or the like. The optical hybrid element 40 has an end face 43, two incident spots 41a and 41b, and one LO light incident spot 42. The incident spot 41a, the LO light incident spot 42, and the incident spot 41b are provided on the end face 43 to be arranged in this order. In other words, the LO light incident spot 42 is located between the incident spot 41a and the incident spot 41b. The end face 43 is an example of a third face in the present disclosure. The incident spot 41a is an example of a first incident spot in the present disclosure. The incident spot 41b is an example of a second incident spot in the present disclosure. A distance between the incident spot 41a and the incident spot 41b is, for example, 500 μm. One polarized light N1 which is separated by polarization is input to the incident spot 41a. The other polarized light N2 which is separated by polarization is input to the incident spot 41b. The polarized light N2 has a polarized plane orthogonal to a polarized plane of the polarized light N1. The polarized light N1 is an example of a first polarized light in the present disclosure. The polarized light N2 is an example of a second polarized light in the present disclosure. The LO light LA is input to the LO light incident spot 42. The optical hybrid element 40 causes each of the polarized light N1 and the polarized light N2 to interfere with the LO light LA. The optical hybrid element 40 demodulates information included in the polarized light N1 and information included in the polarized light N2 by the LO light LA. The optical receiving module 1A may be a coherent module further including a housing (not shown) which accommodates the optical input part 10, the coupling optical system, and the optical hybrid element 40.

The optical input part 10 includes optical fibers 11 and 12 and a lens array 13. The optical fiber 11 is a single mode fiber and propagates the signal light NA. The signal light NA includes the first polarized light N1 and the second polarized light N2 as two polarization components orthogonal to each other. In the embodiment, the first polarized light N1 is a P-polarized wave, and the second polarized light N2 is an S-polarized wave. The optical fiber 12 is a polarization maintaining fiber and propagates P-polarized LO light LA. That is, the polarized plane of the LO light LA is parallel to the polarized plane of the first polarized light N1. The optical fibers 11 and 12 extend in the same direction as each other and are arranged and disposed in a direction intersecting with an extending direction. An optical axis of the optical fiber 11 is parallel to an optical axis of the optical fiber 12.

A lens array 13 is located on one side in the extending direction of the optical fibers 11 and 12 and faces both an end surface of the optical fiber 11 and an end surface of the optical fiber 12. The lens array 13 has lenses 13a and 13b. The lenses 13a and 13b are arranged in the same direction as an arrangement direction of the optical fibers 11 and 12. The lens 13a is optically coupled with the optical fiber 11. The lens 13a is disposed on an optical path of the signal light NA output from the end surface of the optical fiber 11. The lens 13a causes the signal light NA to be collimated light before the signal light NA is incident on an end face 21 and then emits the collimated light toward the end face 21. The lens 13b is optically coupled with the optical fiber 12. The lens 13b is disposed on an optical path of the LO light LA output from the end surface of the optical fiber 12. The lens 13b causes the LO light LA to be collimated light before the oscillation LO light LA is incident on the end face 21 and then emits the collimated light toward the end face 21. The lens 13a is an example of a first collimating lens in the present disclosure. The lens 13b is an example of a second collimating lens in the present disclosure.

The coupling optical system includes an optical separating element 20 and a lens array 30. The optical separating element 20 is disposed at a position on the optical path of the signal light NA and also on the optical path of the LO light LA. The optical separating element 20 includes the end face 21 and an end face 22 located on the side opposite to the end face 21. The end face 21 is an example of a first face in the present disclosure. The end face 22 is an example of a second face in the present disclosure. The end face 22 is parallel to the end face 21. For example, an antireflection film is provided on each of the end faces 21 and 22. In the embodiment, a shape of the optical separating element 20 is a rectangular parallelepiped shape which extends in a direction orthogonal to the end faces 21 and 22 as a longitudinal direction thereof. The end face 21 faces the lens array 13. The lens 13a collimates and emits the signal light NA toward the end face 21. The lens 13b collimates and emits the LO light LA toward the end face 21.

Figure 2:
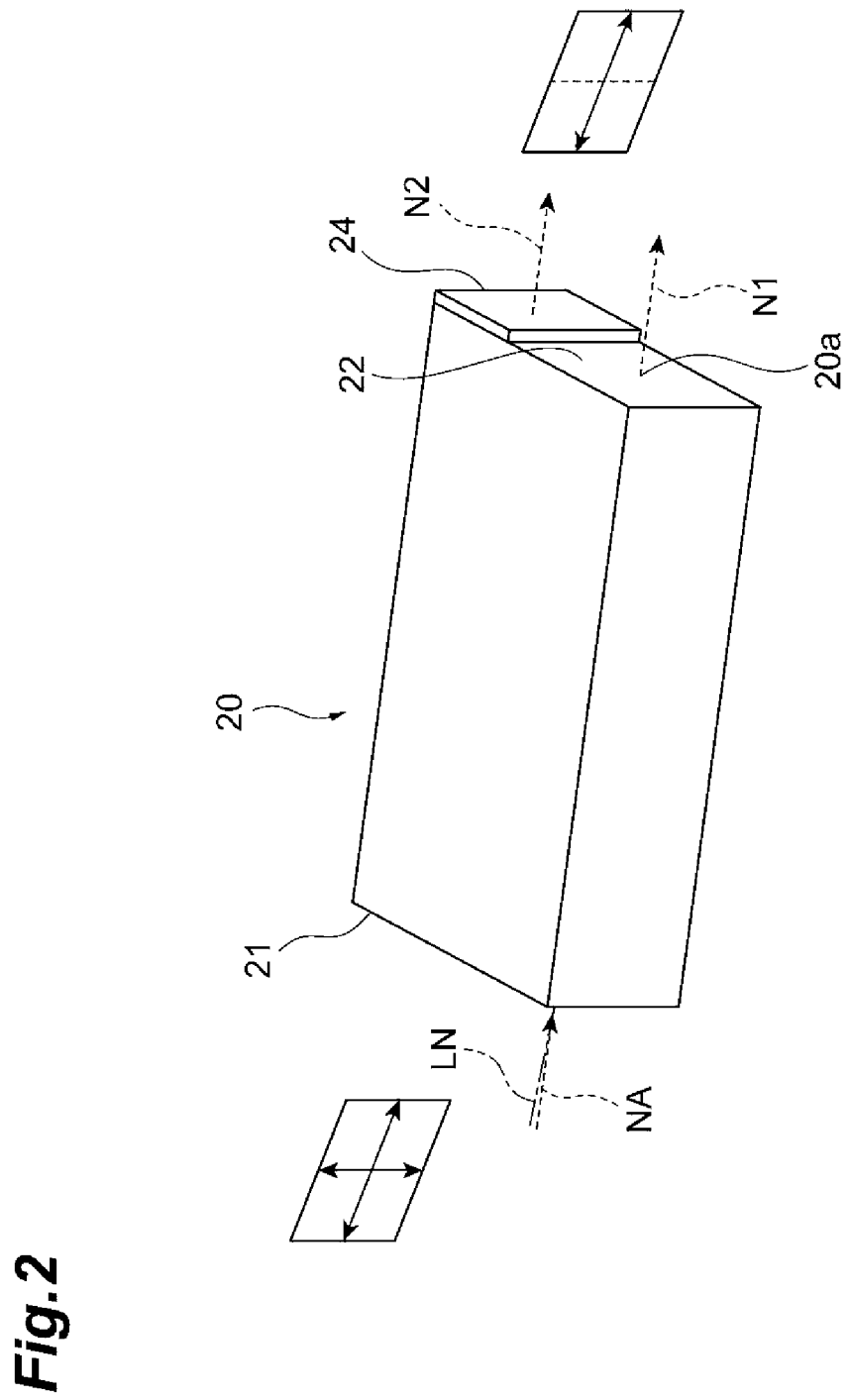
FIG. 2 is a perspective view of an optical separating element shown in FIG. 1.

FIG. 2 is a perspective view of the optical separating element 20 shown in FIG. 1. The optical separating element 20 is disposed in a state in which a normal line LN of the end face 21 is inclined with respect to optical axes of the optical fibers 11 and 12 by a slight angle such as 2 degrees. Both the signal light NA and the LO light LA are incident on the end face 21 at the above-described slight incident angle.

Here, the optical separating element 20 is configured to include a birefringent material, and in one example, is formed of only a birefringent material. The birefringent material is a material having birefringence. A material having a uniaxial property is used as the birefringent material. Specific examples of the birefringent material include titanium dioxide ($TiO_2$), yttrium vanadate ($YVO_4$), lithium niobate ($LiNbO_3$), calcium carbonate ($CaCo_3$), potassium dihydrogenphosphate ($KH_2PO_4$, abbreviation: KDP), quartz, and the like. The birefringent material includes at least one of titanium dioxide, yttrium vanadate, lithium niobate, calcium carbonate, potassium dihydrogenphosphate, and quartz. The optical separating element 20 utilizes an action of the birefringent material to refract the incident signal light NA and the LO light LA at different refraction angles according to directions of the polarized planes and then to emit the refracted lights. That is, the optical separating element 20 refracts a P-polarized wave and an S-polarized wave at refraction angles different from each other. Accordingly, the optical separating element 20 separates the signal light NA into the polarized light N1 and the polarized light N2.

Figure 3:
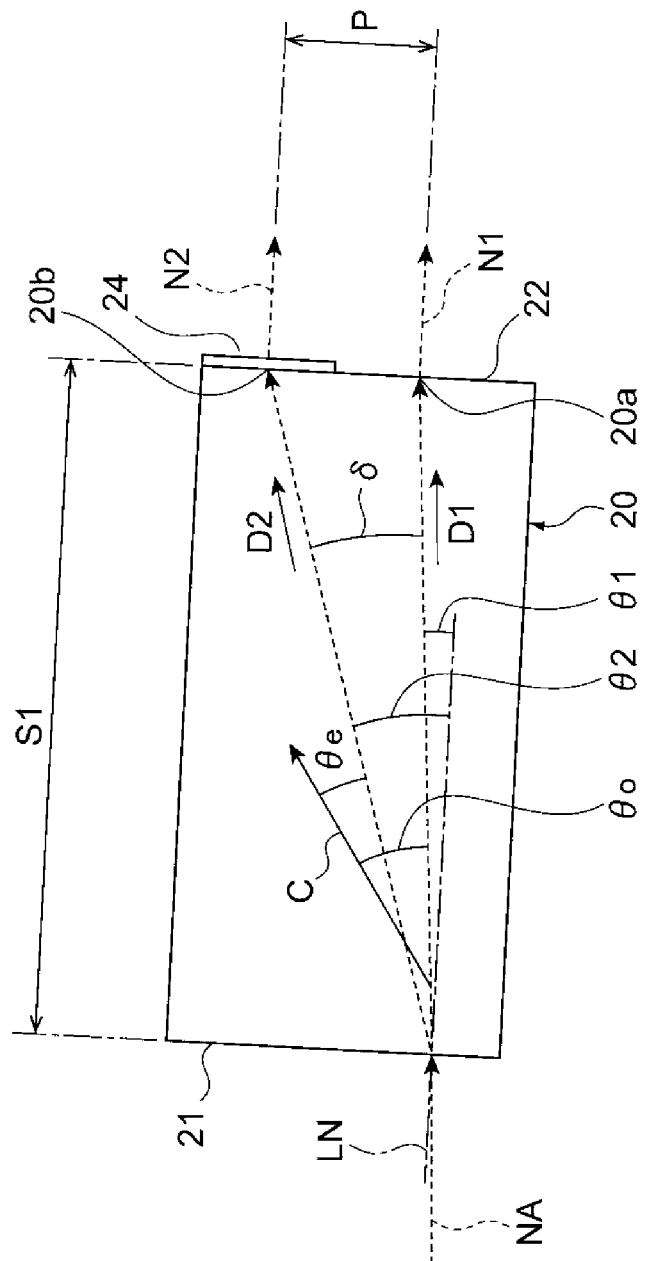
FIG. 3 is a diagram for explaining polarization separation by the optical separating element.

FIG. 3 is a diagram for explaining polarization separation by the optical separating element 20. As shown in FIG. 3, the optical separating element 20 refracts the P-polarized wave of the signal light NA incident from the end face 21 as the polarized light N1 at a refraction angle θ1. The optical separating element 20 makes the polarized light N1 travel straight in a direction D1 and emits the light from the end face 22. The optical separating element 20 refracts the S-polarized wave of the signal light NA incident from the end face 21 as the polarized light N2 at a refraction angle θ2. The refraction angle θ2 is different from the refraction angle θ1 by a separation angle δ. The optical separating element 20 makes the polarized light N2 travel straight in a direction D2 which is inclined with respect to the direction D1 and emits the light from the end face 22. The polarized lights N1 and N2 are respectively emitted from the end face 22 at an emission angle which is the same as an incident angle of the signal light NA on the end face 21. The direction D1 is an example of a first direction in the present disclosure. The direction D2 is an example of a second direction in the present disclosure.

The polarized lights N1 and N2 are separately emitted from the end face 22 in a state in which they are separated by a separation amount P. The separation amount P is the same as a distance between the two incident spots 41a and 41b and is, for example, 500 μm. A length S1 of the optical separating element 20 in the longitudinal direction is set by the following Equations (1) to (3) on the basis of the separation amount P. Equation (1) shows a relationship between the separation amount P and the length S1. Equation (2) shows a relationship between an angle θo and an angle θe. The angle θo is formed between a crystal optical axis C of the optical separating element 20 and the P polarized light, that is, an ordinary ray. The angle θe is formed between the crystal optical axis C of the optical separating element 20 and the S polarized wave, that is, an extraordinary ray. In Equation (2), $n_o$ is a refractive index of the ordinary ray, and $n_e$ is a refractive index of the extraordinary ray. Equation (3) shows a relationship between the separation angles δ of the polarized lights N1 and N2 and the angles θo and θe.

[Equation 1]
$$P = S1 \tan\delta \quad (1)$$

[Equation 2]
$$\tan\theta_e = \frac{n_o^2}{n_e^2}\tan\theta_o \quad (2)$$

[Equation 3]
$$\tan\delta = \tan(\theta_o - \theta_e) \quad (3)$$

In FIG. 3, the angles θo and θe are shown. The separation angle δ becomes maximum when the angle θo is within a range of 47 degrees to 49 degrees. Therefore, in the embodiment, the optical separating element 20 having an angle θo within a range of 47 degrees to 49 degrees, for example, 48 degrees is used.

Referring again to FIG. 1, the optical separating element 20 further refracts the LO light LA incident from the end face 21 at the same angle as that of the polarized light N1, that is, at a refraction angle θ1 shown in FIG. 3. The optical separating element 20 makes the LO light LA travel straight in the same direction as that of the polarized light N1, that is, the direction D1 shown in FIG. 3 and emits the light from the end face 22. The LO light LA is emitted from the end face 22 at an emission angle which is the same as the incident angle on the end face 21. The LO light LA is emitted from between an emission spot 20a of the polarized light N1 and an emission spot 20b of the polarized light N2 on the end face 22. An emission spot 20c of the LO light LA on the end face 22 is located, for example, at a midspot between the emission spot 20a and the emission spot 20b. The emission spot 20a is an example of a first emission spot in the present disclosure. The emission spot 20b is an example of a second emission spot in the present disclosure. The emission spot 20c is an example of a LO light emission spot in the present disclosure.

A half-wave plate, that is, a λ/2 plate 24 is provided on the optical separating element 20. The λ/2 plate 24 is an example of a polarization rotator in the embodiment. The λ/2 plate 24 may be formed of a flat birefringent material such as quartz. The λ/2 plate 24 is provided in a partial region of the end face 22 including the emission spot 20b of the polarized light N2. This region does not include the emission spots 20a and 20c of the polarized light N1 and the LO light LA. The polarized light N2 passes through the λ/2 plate 24 when it is emitted from the optical separating element 20. The λ/2 plate 24 rotates the polarized plane of the polarized light N2 by 90 degrees. Therefore, the polarized plane of the polarized light N2 which has passed through the λ/2 plate 24 coincides with the polarized plane of the polarized light N1 and the polarized plane of the LO light LA.

The lens array 30 is disposed between the optical separating element 20 and the optical hybrid element 40. One surface of the lens array 30 faces the end face 22 of the optical separating element 20. The other surface of the lens array 30 faces the end face 43 of the optical hybrid element 40. In other words, the end face 22 and the end face 43 face each other with the lens array 30 interposed therebetween.

The lens array 30 includes lenses 31, 32, and 33. The lenses 31, 32, and 33 are arranged in this order in the same direction as the arrangement direction of the incident spot 41a, the LO light incident spot 42, and the incident spot 41b. The lens 31 is disposed on the optical path of the polarized light N1 emitted from the end face 22 and focuses the polarized light N1 on the incident spot 41a. The lens 32 is disposed on the optical path of the LO light LA emitted from the end face 22 and focuses the LO light LA on the LO light incident spot 42. The lens 33 is disposed on the optical path of the polarized light N2 emitted from the end face 22 and focuses the polarized light N2 on the incident spot 41b.

The incident spot 41a is optically coupled with the emission spot 20a of the polarized light N1 on the end face 22. The LO light incident spot 42 is optically coupled with the emission spot 20c of the LO light LA on the end face 22. The incident spot 41b is optically coupled with the emission spot 20b of the polarized light N2 on the end face 22. The polarized light N1 is input to the optical hybrid element 40 from the incident spot 41a. The LO light LA is input to the optical hybrid element 40 from the LO light incident spot 42. The LO light LA is input to the optical hybrid element 40 and then separated into two LO lights. The polarized light N2 is input to the optical hybrid element 40 from the incident spot 41b. The optical hybrid element 40 includes a multimode interference (MMI) waveguide, and a photodiode optically coupled with the waveguide.

The MMI waveguide is, for example, a waveguide formed on an InP substrate. The MMI waveguide causes the polarized light N1 to optically interfere with one of the LO lights separated from the LO light LA to perform a homodyne detection or a heterodyne detection. Thus, the MMI waveguide separates the polarized light N1 into a phase component which coincides with a phase of the LO light LA and a phase component which is different from the phase of the LO light LA by 90 degrees, and then the MMI waveguide demodulates information contained in the polarized light N1. That is, the optical hybrid element 40 demodulates two independent pieces of information regarding the polarized light N1. Similarly, the MMI waveguide causes the polarized light N2 to optically interfere with the other LO light separated from the LO light LA to perform a homodyne detection or a heterodyne detection. Accordingly, the MMI waveguide separates the polarized light N2 into a phase component which coincides with the phase of the LO light LA and a phase component which is different from the phase of the LO light LA by 90 degrees, and then the MMI waveguide demodulates information contained in the polarized light N2. That is, the optical hybrid element 40 demodulates two independent pieces of information regarding the polarized light N2. The four pieces of independent information demodulated by the optical hybrid element 40 are guided to the outside of the optical receiving module 1A after signal processing.

Figure 13:
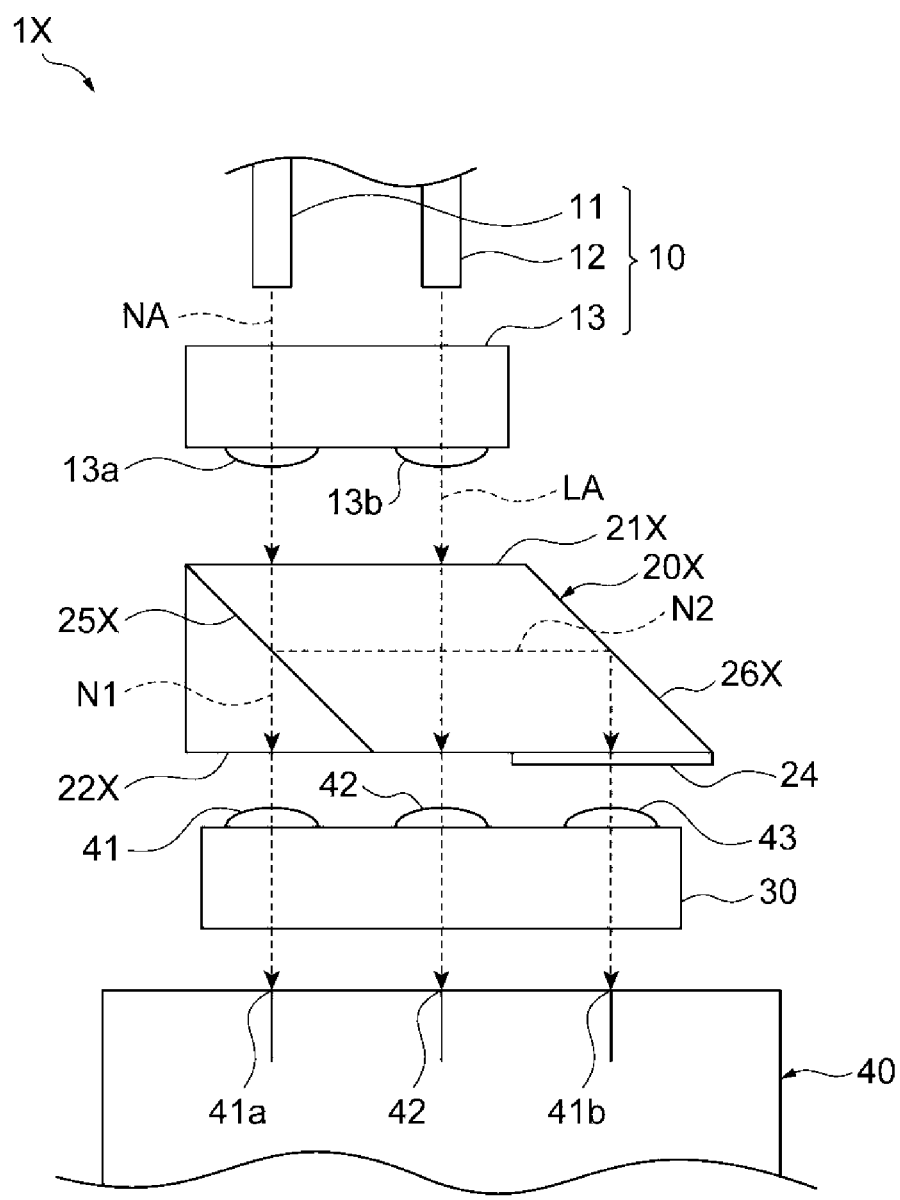
FIG. 13 is a plan view showing an outline of an optical receiving module as an optical module according to a comparative example.

Operations and effects of the above-described optical receiving module 1A will be described. First, a comparative example will be described. FIG. 13 is a plan view showing an outline of an optical receiving module 1X as an optical module according to a comparative example. The optical receiving module 1X is different from the optical receiving module 1A in that it includes an optical separating element 20X instead of the optical separating element 20. The optical separating element 20X includes an end face 21X which faces the lens array 13, and an end face 22X which faces the lens array 30. The end face 22X is parallel to the end face 21X. For example, an antireflection film is provided on each of the end faces 21X and 22X. The λ/2 plate 24 is provided on the end face 22X, as in the optical separating element 20.

The optical separating element 20X is formed by sticking together a triangular prism and a parallelogram prism which are formed of glass on each other. The end face 21X is a surface which includes one of a pair of opposite sides of the parallelogram prism. The end face 22X is a surface which includes the other one of the pair of opposite sides of the parallelogram prism and one side of the triangular prism. The triangular prism is stuck to a surface including one of another pair of opposite sides of the parallelogram prism. In the parallelogram prism, a dielectric multilayer film 25X is provided on a surface sticking to the triangular prism. The dielectric multilayer film 25X transmits the P-polarized wave and reflects the S-polarized wave. Thus, the optical separating element 20X separates the polarized lights N1 and N2. When the signal light NA passes through the optical separating element 20X, the polarized light N1 travels straight, and the polarized light N2 changes the optical path by 90 degrees. In the parallelogram prism, a reflection film 26X is provided on a surface parallel to the surface sticking to the triangular prism. Therefore, the optical path of the polarized light N2 as the S-polarized wave reflected by the dielectric multilayer film 25X is further changed by −90 degrees and becomes parallel to the optical path of the polarized light N1.

Figure 14:
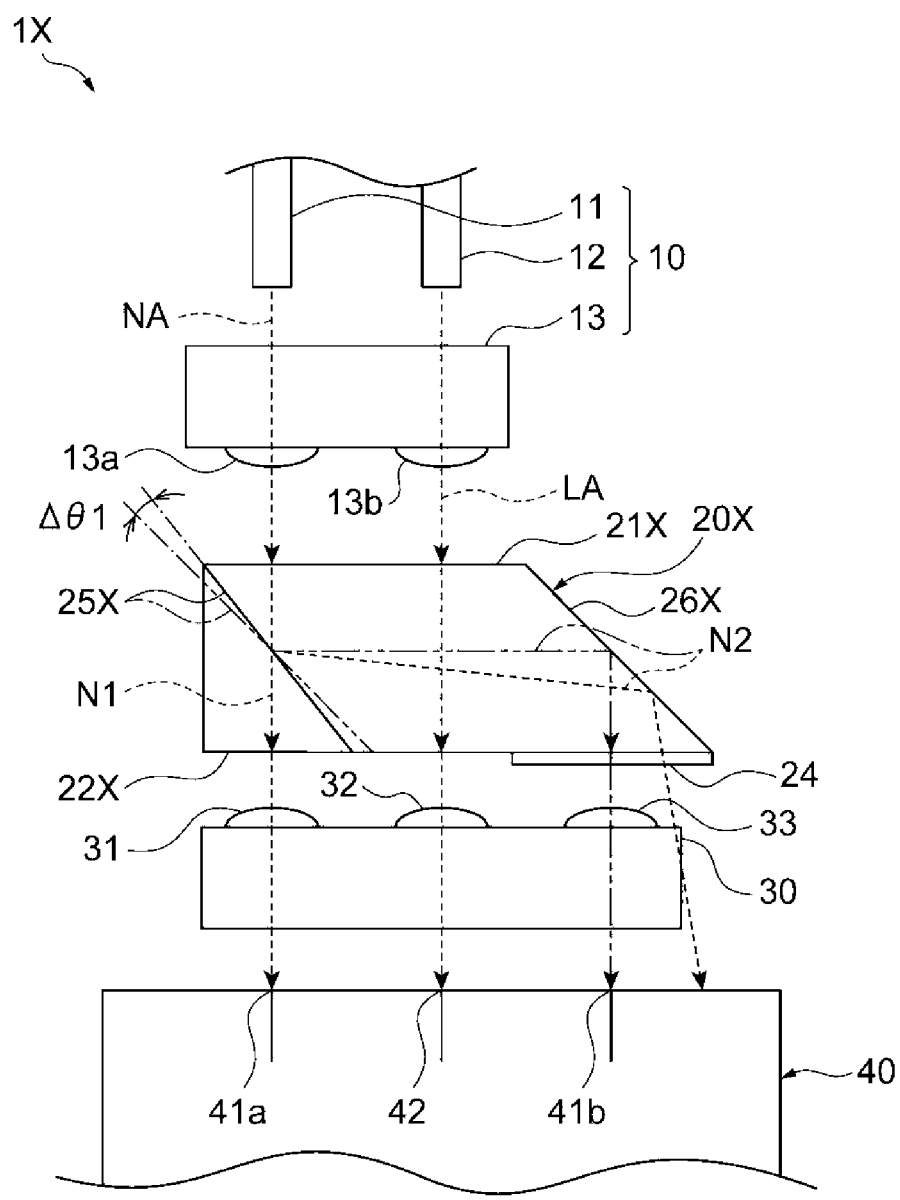
FIG. 14 is a diagram for explaining an optical path in a state in which a manufacturing error occurs in the comparative example.
Figure 16:
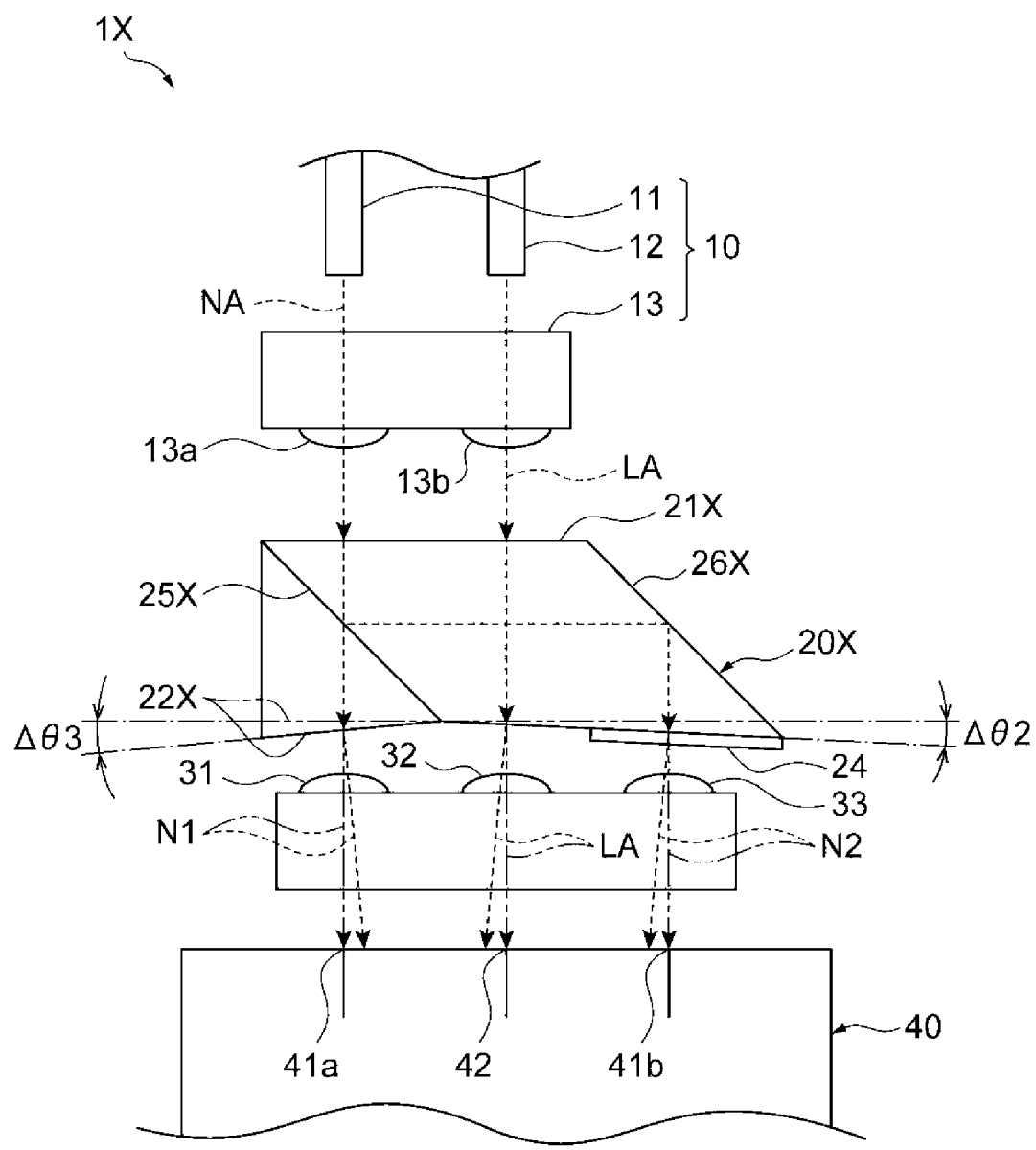
FIG. 16 is a diagram for explaining an optical path in a state in which the manufacturing error occurs in the comparative example.

Here, a case in which a manufacturing error occurs in the optical receiving module 1X will be described. FIGS. 14 and 16 are diagrams for explaining an optical path in a state in which the manufacturing error occurs in the comparative example. In FIGS. 14 and 16, a state in which the manufacturing error is zero is indicated by a two-dot chain line. As shown in FIG. 14, for example, in the optical separating element 20X, a deviation angle Δθ1 may occur in the dielectric multilayer film 25X due to the manufacturing error. In such a case, a deviation occurs in the optical path of the polarized light N2 due to a fact that the dielectric multilayer film 25X and the reflective film 26X are not parallel. Thus, coupling efficiency in the polarized light N2 is reduced. Therefore, a difference in the coupling efficiency occurs between the polarized lights N1 and N2.

Figure 15:
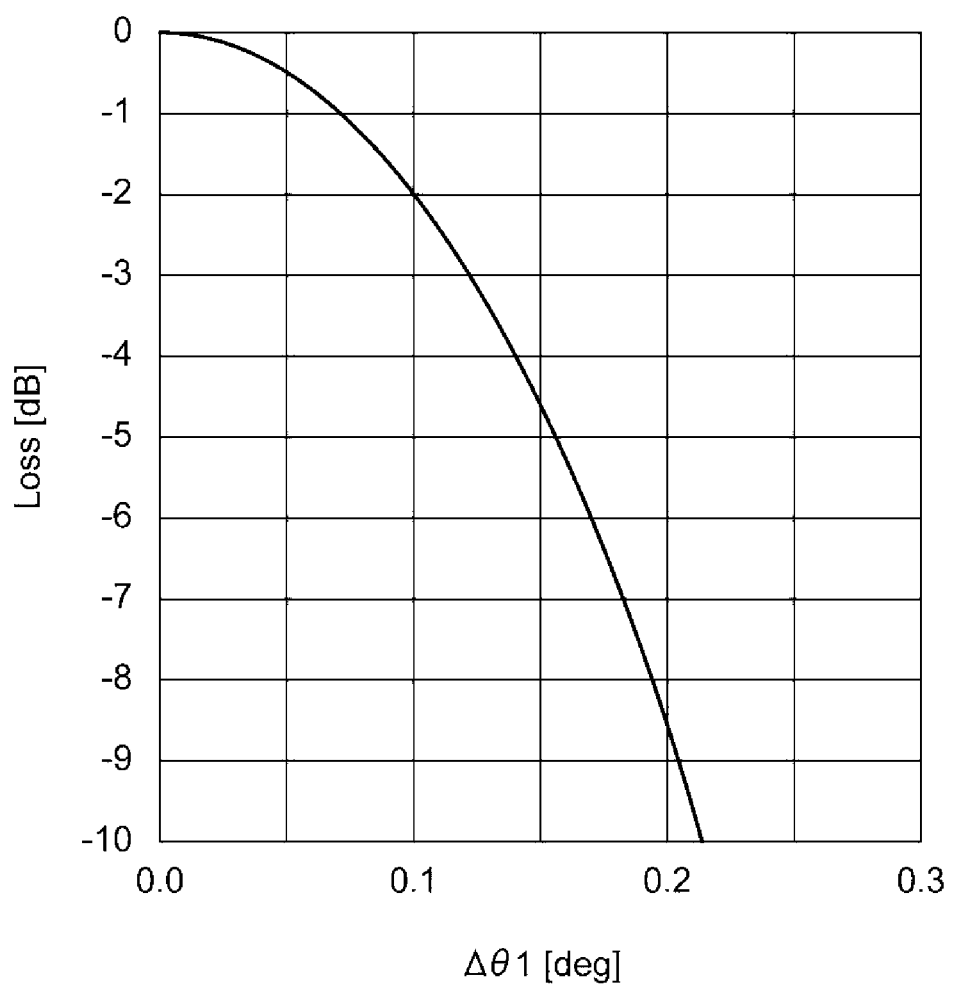
FIG. 15 is a graph showing a relationship between the manufacturing error and loss of coupling efficiency.

FIG. 15 is a graph showing a relationship between the manufacturing error and loss of the coupling efficiency. In the graph of FIG. 15, a horizontal axis indicates a magnitude of a deviation angle Δθ1, and a vertical axis indicates a magnitude of the loss of the coupling efficiency of the polarized light N2. Generally, an allowable value of the loss of the coupling efficiency is about 0.5 dB. Therefore, as shown in FIG. 15, the deviation angle Δθ1 is required to be within a range of −0.05 degrees or more and 0.05 degrees or less as a manufacturing accuracy of the optical separating element 20X.

As shown in FIG. 16, for example, in the optical separating element 20X, a deviation angle Δθ2 may occur on a surface of the end face 22X formed by the parallelogram prism due to the manufacturing error. Alternatively, a deviation angle Δθ3 may occur on a surface of the end face 22X formed by the triangular prism. In such a case, the optical path of at least one of the polarized lights N1 and N2 is deviated due to a fact that the end face 21X, that is, an incident surface is not parallel to the end face 22X, that is, an emission surface. Thus, the coupling efficiency is reduced in at least one of the polarized lights N1 and N2. Therefore, a difference in the coupling efficiency occurs between the polarized lights N1 and N2.

Figure 17:
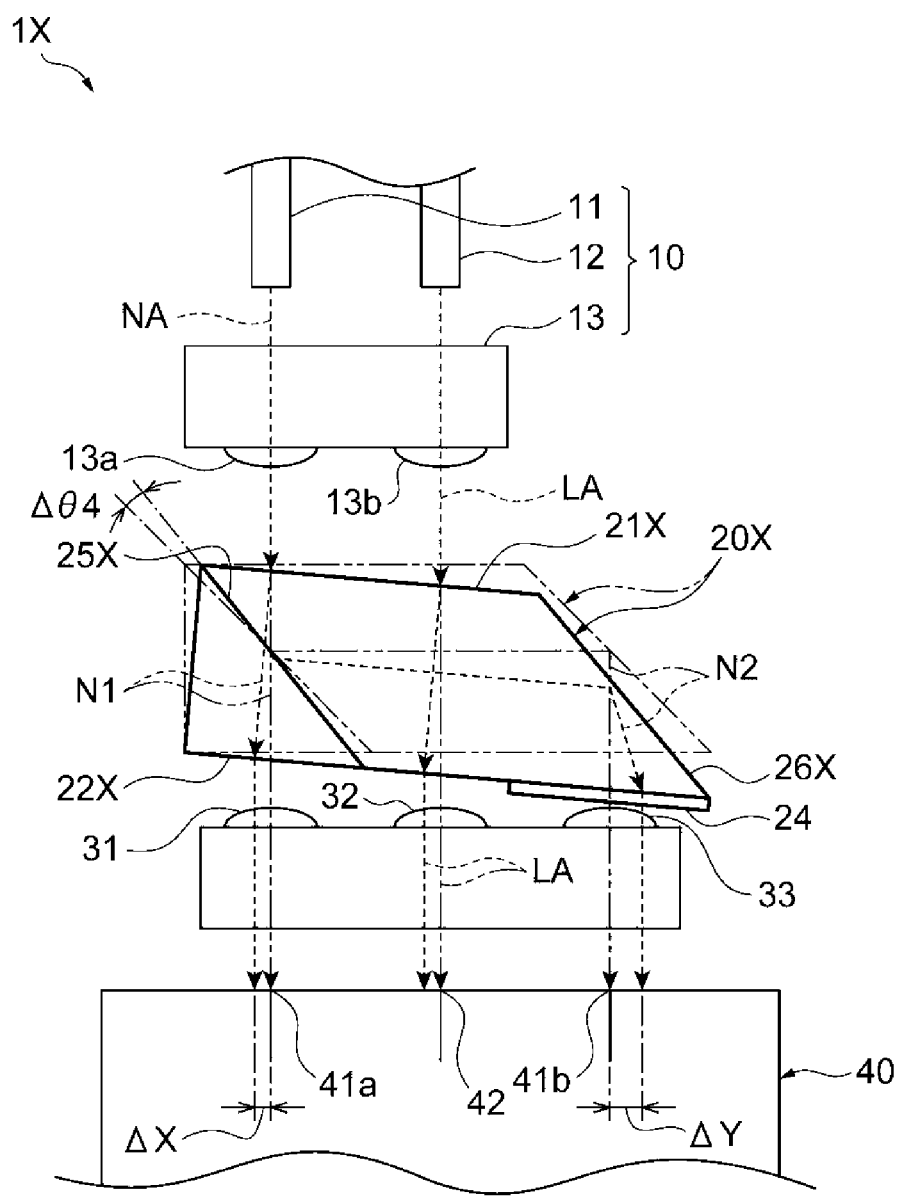
FIG. 17 is a diagram for explaining an optical path in the state in which the mounting error occurs in the comparative example.

FIG. 17 is a diagram showing an optical path in a state in which the mounting error occurs in the comparative example. In FIG. 17, a state in which the mounting error is zero is indicated by a two-dot chain line. As shown in FIG. 17, for example, in the optical separating element 20X, a rotation deviation Δθ4 may occur due to the mounting error. In such a case, an axis deviation ΔX occurs between the polarized light N1 and the incident spot 41a, and an axis deviation ΔY occurs between the polarized light N2 and the incident spot 41b. In addition, a beam interval between the polarized lights N1 and N2 is wider than an interval between the incident spots 41a and 41b by just a value obtained by adding the axis deviation ΔX and the axis deviation ΔY. That is, a parallel deviation (ΔX+ΔY) having a magnitude obtained by adding the axial deviation ΔX and the axial deviation ΔY occurs. Therefore, when the parallel deviation (ΔX+ΔY) is evenly allocated to the polarized lights N1 and N2, a parallel axis deviation (ΔX+ΔY)/2 occurs between the polarized light N1 and the incident spot 41a, and between the polarized light N2 and the incident spot 41b.

Figure 18:
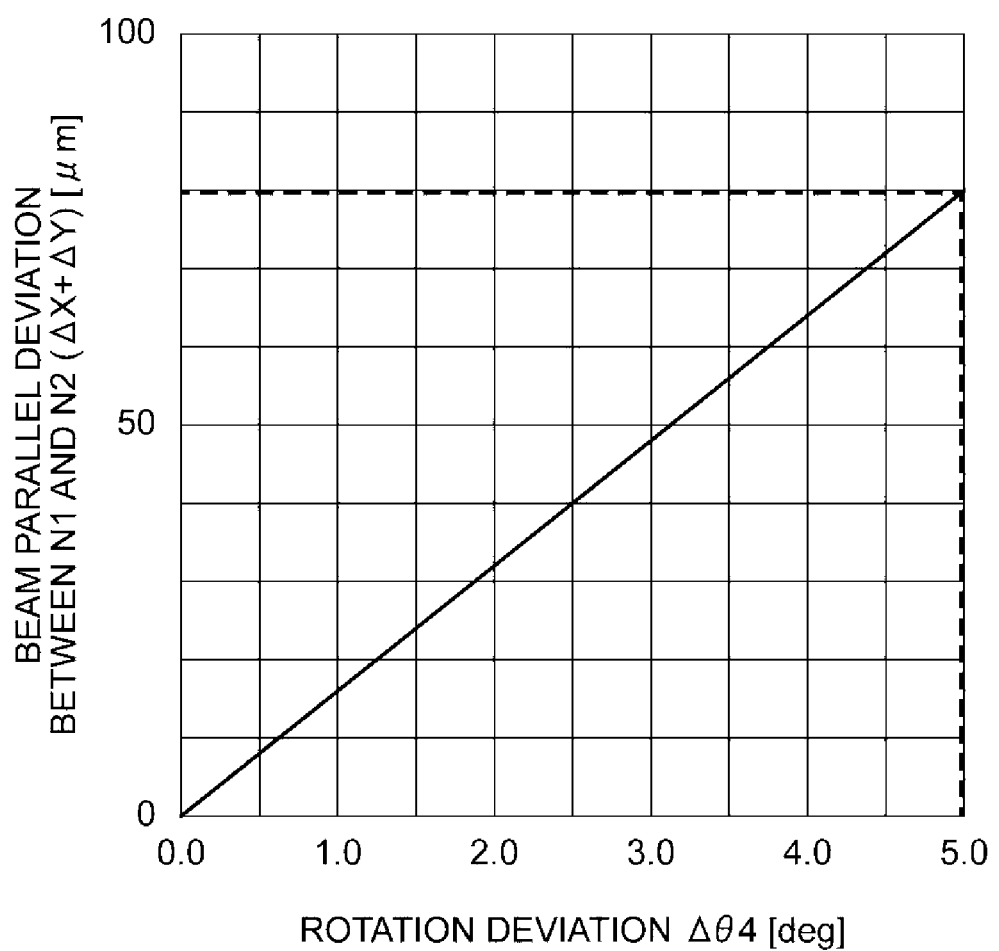
FIG. 18 is a graph showing a relationship between a rotational deviation due to the mounting error and a parallel deviation of a light interval between two signal lights in the comparative example.
Figure 19:
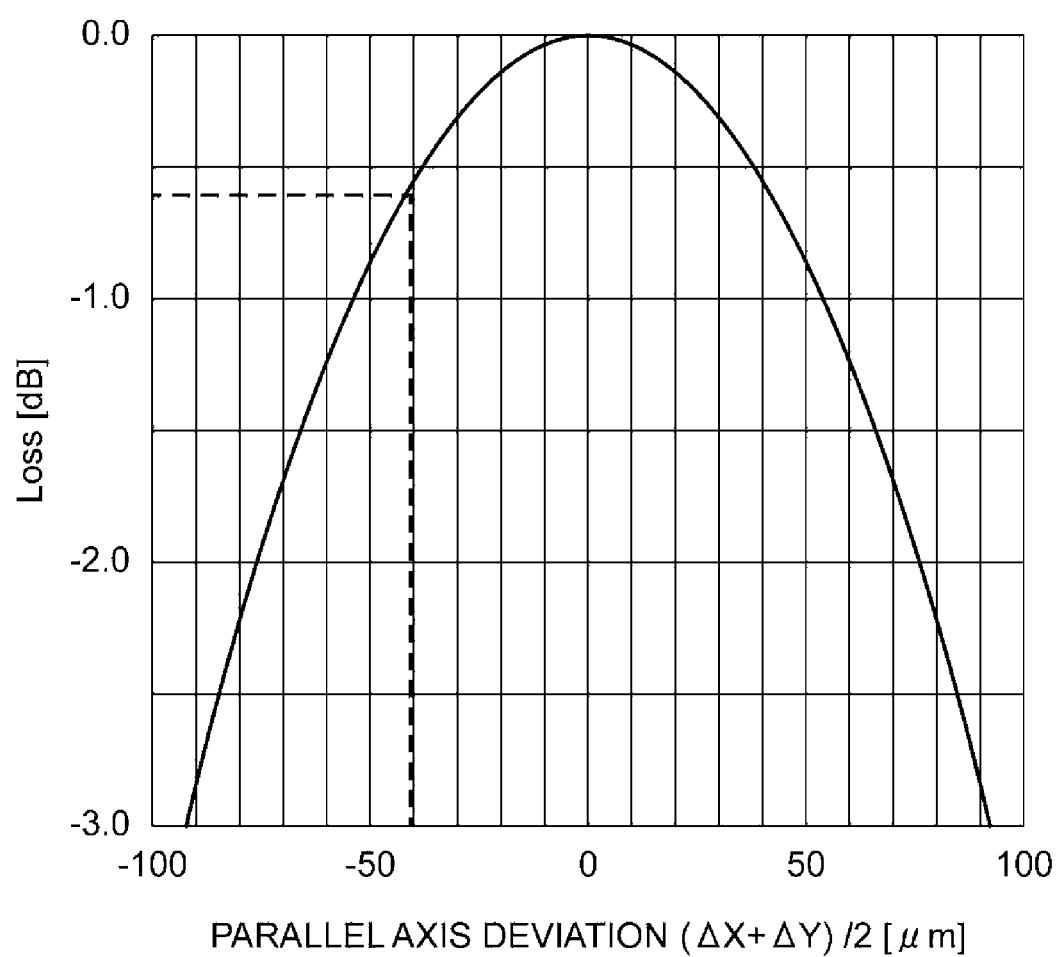
FIG. 19 is a graph showing a relationship between a parallel axis deviation of the light interval between the two signal lights and the coupling efficiency.

FIG. 18 is a graph showing a relationship between the rotation deviation Δθ4 due to the mounting error and the parallel deviation (ΔX+ΔY) of the beam interval between the polarized lights N1 and N2 in the comparative example. FIG. 19 is a graph showing a relationship between the parallel axis deviation (ΔX+ΔY)/2 of the beam interval between the polarized lights N1 and N2 and the coupling efficiency. In the graph of FIG. 18, a horizontal axis indicates a magnitude of the rotational deviation Δθ4, and a vertical axis indicates a magnitude of the parallel deviation (ΔX+ΔY). In the graph of FIG. 19, a horizontal axis indicates a magnitude of the parallel axis deviation (ΔX+ΔY)/2 between the polarized lights N1 and N2 and the incident spots 41a and 41b, and a vertical axis indicates the loss of the coupling efficiency of the polarized lights N1 and N2. As shown in FIG. 18, in the optical separating element 20X, for example, when the rotation deviation Δθ4 is 5 degrees, the parallel deviation (ΔX+ΔY) is about 80 μm as shown by a broken line in the graph of FIG. 18. In this case, since the respective parallel axis deviations (ΔX+ΔY)/2 of the polarized lights N1 and N2 and the incident spots 41a and 41b are about 40 μm, it can be understood that the coupling efficiency is lost by about 0.6 dB as shown by a broken line in the graph of FIG. 19. In other words, light receiving sensitivity of each of the incident spots 41a and 41b with respect to the polarized lights N1 and N2 is reduced by about 0.6 dB.

On the other hand, in the optical receiving module 1A according to the first embodiment, the optical separating element 20 includes a birefringent material. Thus, the signal light NA is separated by using a difference in the refraction angle of each of the polarization components when it incident on the end face 21 of the optical separating element 20. The polarized lights N1 and N2 separated by polarization in this way travel without being reflected and are emitted from the end face 22. Therefore, each of the emission angles of the polarized lights N1 and N2 from the end face 22 is the same as the incident angle of the signal light NA on the end face 21. Therefore, even if the end faces 21 and 22 are not parallel to each other due to the manufacturing error, the optical path of the polarized light N1 and the optical path of the polarized light N2 are deviated by just the same angle with respect to a design value when they are emitted from the end face 22. Further, even if the angle θo formed by the crystal optical axis C and a traveling direction of the P-polarized wave is deviated from the above-described range due to another manufacturing error, when they are emitted from the end face 22, the optical path of the polarized light N1 and the optical path of the polarized light N2 are parallel to each other, and only the emission spots 20a and 20b on the end face 22 are deviated from the design value. Thus, it is possible to prevent an angle of only one of the polarized light N1 and the polarized light N2 from being largely deviated from the design value. Therefore, it is possible to curb the difference in the coupling efficiency between the polarized lights N1 and N2.

Figure 4:
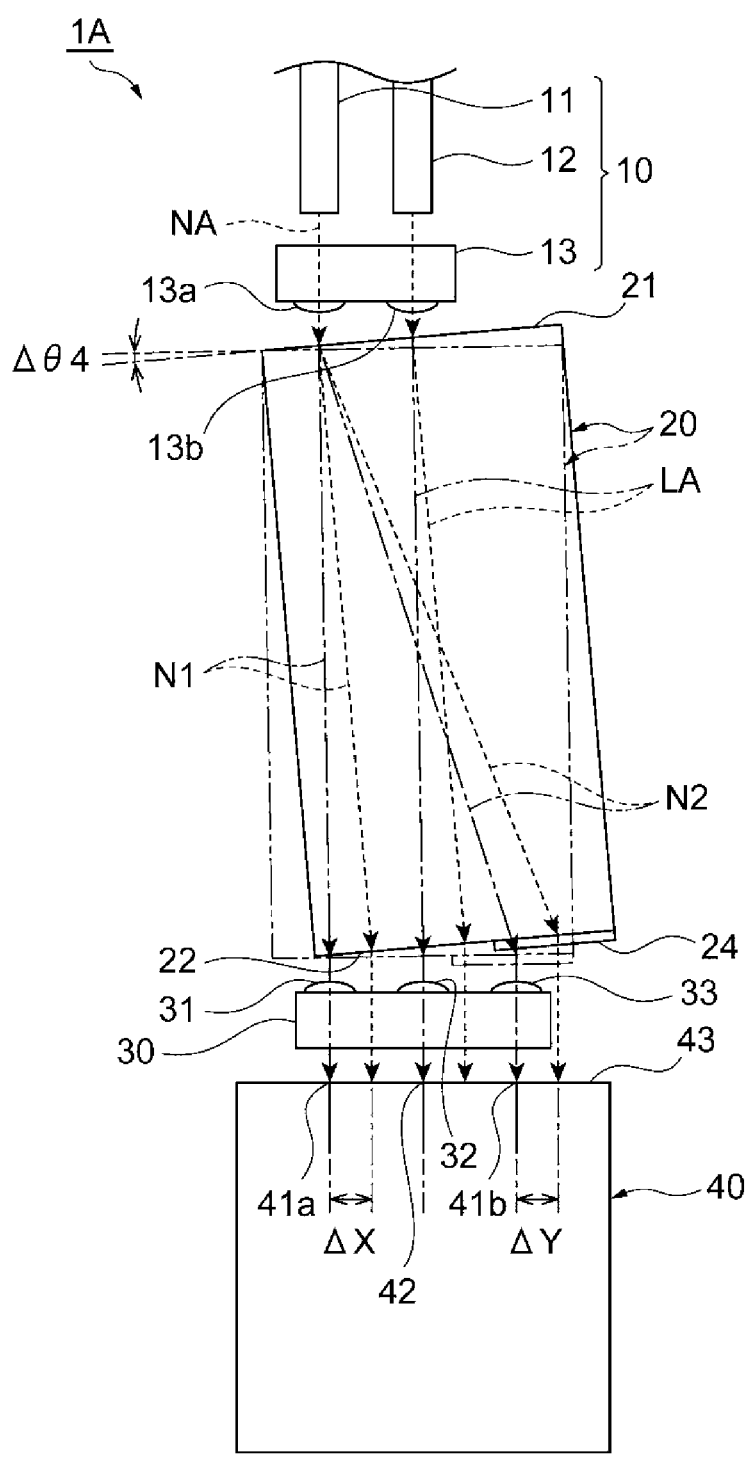
FIG. 4 is a diagram for explaining an optical path in a state in which a mounting angle of the optical separating element is deviated.
Figure 5:
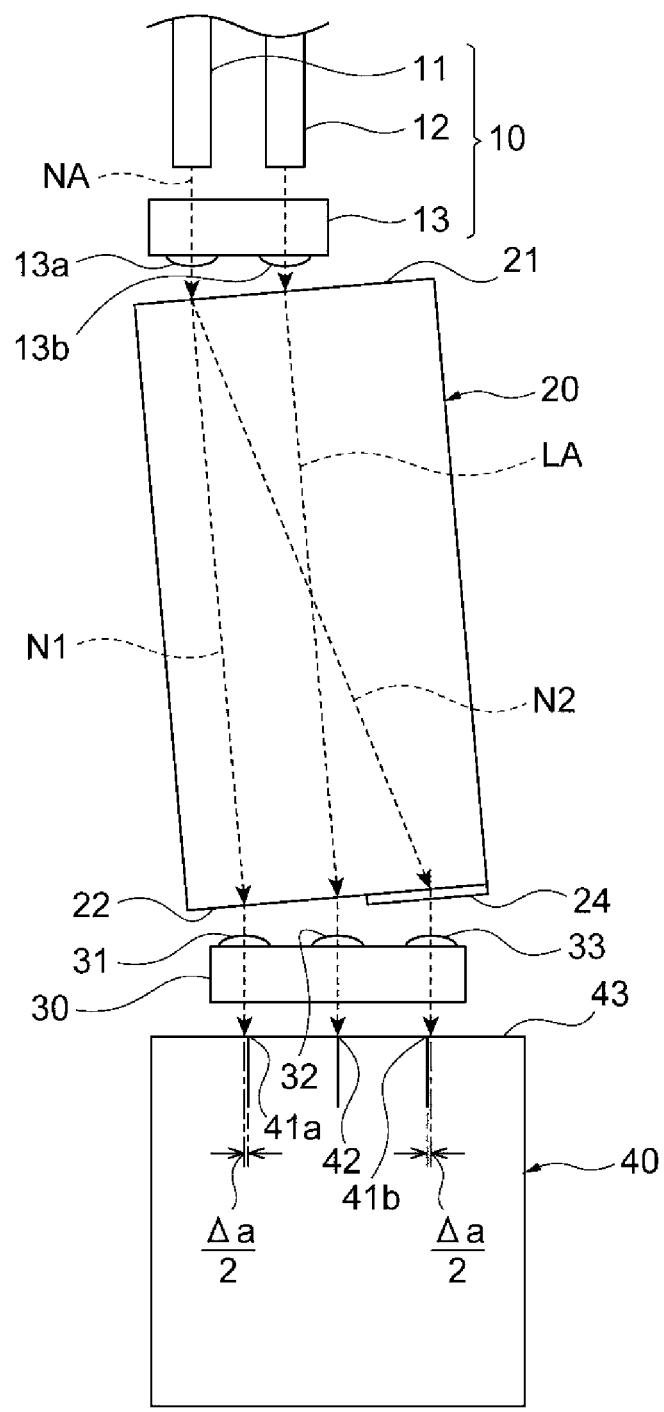
FIG. 5 is a diagram for explaining an optical path in the state in which the mounting angle of the optical separating element is deviated.

FIGS. 4 and 5 are diagrams for explaining an optical path in a state in which a mounting angle of the optical separating element 20 is deviated. In FIG. 4, a state in which the mounting error is zero is indicated by a two-dot chain line. As shown in FIG. 4, it is assumed that the rotation deviation Δθ4 occurs in the optical separating element 20 due to the mounting error. In this case, the axis deviation ΔX occurs between the polarized light N1 and the incident spot 41a, and the axis deviation ΔY occurs between the polarized light N2 and the incident spot 41b. Even in such a case, the beam interval between the polarized lights N1 and N2 is unlikely to change from the design value. As shown in FIG. 5, as a change in the beam interval between the polarized lights N1 and N2 with respect to the design value, a parallel deviation Δa which is a difference between the axis deviation ΔX and the axis deviation ΔY is only slightly generated. FIG. 5 shows a state in which the parallel deviation Δa is evenly allocated to the polarized lights N1 and N2 by adjusting the optical axes of the optical separating element 20 and the optical hybrid element 40, that is, a state in which the parallel axis deviation Δa/2 occurs between the polarized light N1 and the incident spot 41a and between the polarized light N2 and the incident spot 41b.

Figure 6:
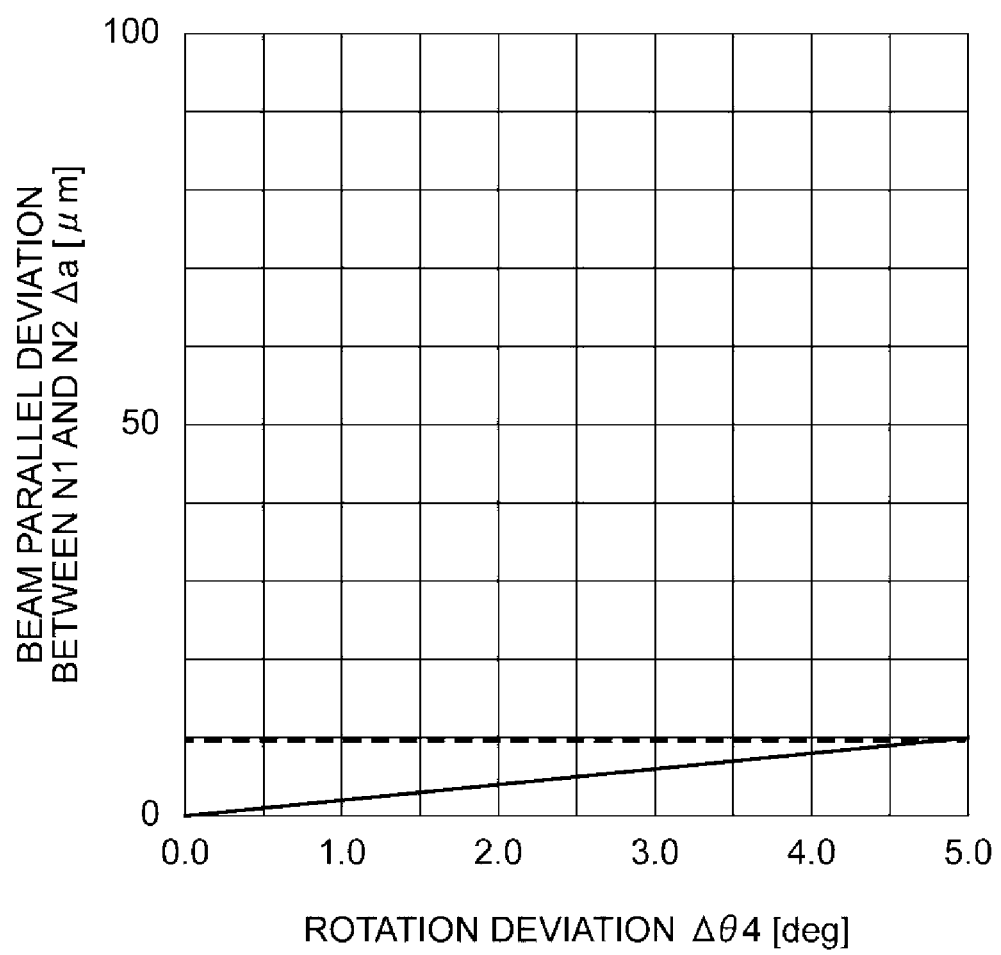
FIG. 6 is a graph showing a relationship between a rotational deviation due to a mounting error of the optical separating element and a parallel deviation of a light interval between polarized lights N1 and N2.
Figure 7:
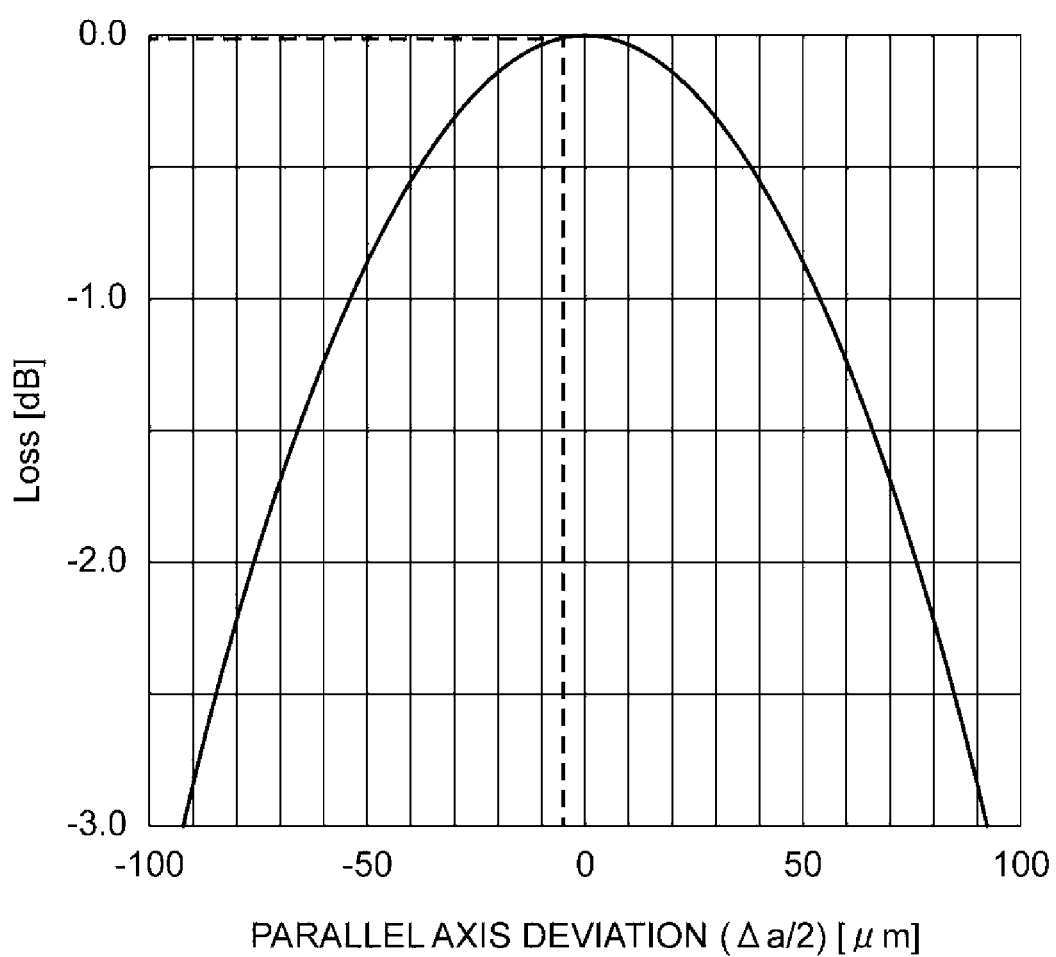
FIG. 7 is a graph showing a relationship between a parallel axis deviation of a light interval between two signal lights and coupling efficiency.

FIG. 6 is a graph showing a relationship between the rotation deviation Δθ4 due to the mounting error of the optical separating element 20 and the parallel deviation Δa of the beam interval between the polarized lights N1 and N2. FIG. 7 is a graph showing a relationship between the parallel axis deviation Δa/2 of the beam interval between the polarized lights N1 and N2 and the coupling efficiency. In the graph of FIG. 6, a horizontal axis indicates a magnitude of the rotation deviation Δθ4, and a vertical axis indicates a magnitude of the parallel deviation Δa. In the graph of FIG. 7, a horizontal axis indicates a magnitude of the parallel axis deviation Δa/2 between the polarized lights N1 and N2 and the incident spots 41a and 41b, and a vertical axis indicates a magnitude of the loss of the coupling efficiency of each of the polarized lights N1 and N2. As shown by a broken line in the graph of FIG. 6, in the optical separating element 20, for example, when the rotation deviation Δθ4 is 5 degrees, the parallel deviation Δa is about 10 μm. In this case, since the parallel axis deviation Δa/2 between the polarized lights N1 and N2 and the incident spots 41a and 41b is about 5 μm, the loss of the coupling efficiency is less than 0.1 dB as shown by a broken line in the graph of FIG. 7. In other words, it is possible to curb a decrease in light receiving sensitivity of the incident spots 41a and 41b with respect to the polarized lights N1 and N2 to less than 0.1 dB. Therefore, even when the rotation deviation Δθ4 due to the mounting error is about the same, the loss of the coupling efficiency is curbed more than that in the optical receiving module 1X according to the comparative example.

As described above, according to the optical receiving module 1A according to the first embodiment, even when the mounting angle of the optical separating element 20 is deviated, the beam interval between the emitted polarized lights N1 and N2 is unlikely to change from the design value. Therefore, the parallel axis deviation Δa/2 of the optical path of the polarized light N1 and the optical path of the polarized light N2 with respect to the incident spots 41a and 41b is curbed, respectively. In this way, it is possible to make the coupling efficiencies of the polarized lights N1 and N2, which are separated from the signal light NA by the optical separating element 20, uniform and to realize high coupling efficiency.

In the first embodiment, the optical receiving module 1A further includes the lenses 13a and 13b which cause the signal light NA and the LO light LA to be collimated lights before the signal light NA and the LO light LA are incident on the end face 21 and then emit the collimated lights toward the end face 21. Accordingly, the polarized lights N1 and N2 and the LO light LA as the collimated lights can be propagated to the optical separating element 20.

In the optical receiving module 1A according to the first embodiment, the λ/2 plate 24 is provided in a region of the end face 22 including the emission spot 20b of the polarized light N2. Thus, the polarized plane of the polarized light N2 which has passed through the optical separating element 20 can be matched with the polarized plane of the LO light LA.

Second Embodiment

Figure 8:
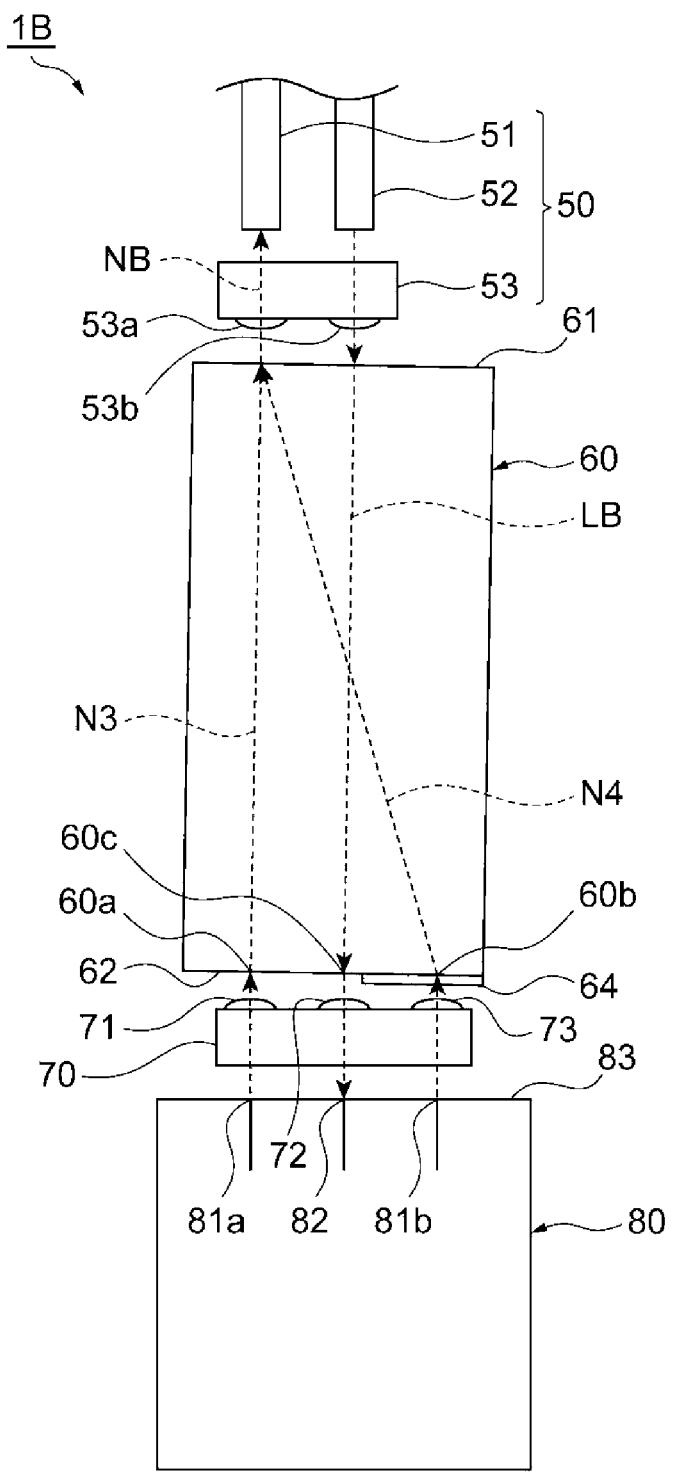
FIG. 8 is a plan view showing an outline of an optical modulation module as an optical module according to a second embodiment.

Next, an optical module according to a second embodiment will be described. FIG. 8 is a plan view showing an outline of an optical modulation module 1B as the optical module according to the second embodiment. The optical modulation module 1B shown in FIG. 8 is an optical modulation module for coherent communication. The optical modulation module 1B phase-modulates unmodulated light LB and generates a signal light NB. The unmodulated light is continuous light with a constant intensity. The optical modulation module 1B includes an optical input/output part 50 and an optical modulation element 80. The optical modulation module 1B further includes a coupling optical system which optically couples the optical input/output part 50 with the optical modulation element 80. The optical modulation element 80 generates two polarized lights N3 and N4 from the linearly polarized unmodulated light LB. In the coupling optical system, the two polarized lights N3 and N4 are combined so that polarized planes thereof are orthogonal to each other, and are guided to the optical input/output part 50 as the signal light NB. The signal light NB includes a first polarized light N3 and a second polarized light N4 as two polarization components orthogonal to each other. That is, the second polarized light N4 has a polarized plane orthogonal to a polarized plane of the first polarized light N3. In the embodiment, the first polarized light N3 is a P-polarized wave, and the second polarized light N4 is an S-polarized wave. A polarized plane of the unmodulated light LB is parallel to the polarized plane of the first polarized light N3.

The optical modulation element 80 is a semiconductor element of which a main constituent material is InP, Si, or the like. The optical modulation element 80 has an end face 83, two emission spots 81a and 81b, and one unmodulated light incident spot 82. One emission spot 81a, the unmodulated light incident spot 82, and the other emission spot 81b are provided on the end face 83 to be arranged in this order. In other words, the unmodulated light incident spot 82 is provided between the emission spot 81a and the emission spot 81b. The end face 83 is an example of a third face in the present disclosure. The emission spot 81a is an example of a third emission spot in the present disclosure. The emission spot 81b is an example of a fourth emission spot in the present disclosure. A distance between the emission spot 81a and the emission spot 81b is, for example, 500 μm. The optical modulation element 80 separates the unmodulated light LB input from the unmodulated light incident spot 82 into one polarized light N3 and the other polarized light N4 and modulates the polarized light N3 and the polarized light N4. The emission spot 81a outputs the modulated polarized light N3. The emission spot 81b outputs the modulated polarized light N4. The polarized light N3 is an example of a first signal light in the present disclosure. The polarized light N4 is an example of a second signal light in the present disclosure. The optical modulation module 1B may be a coherent module further including a housing (not shown) which accommodates the optical input/output part 50, the coupling optical system, and the optical modulation element 80.

The unmodulated light LB is input to the optical modulation element 80 from the unmodulated light incident spot 82. The unmodulated light LB is input from an unmodulated light incident spot 82 and then separated into two unmodulated lights. The optical modulation element 80 includes an optical modulation waveguide. The optical modulation waveguide is, for example, a waveguide formed on an InP substrate. The optical modulation waveguide performs coherent modulation for generating the polarized light N3 on one of the unmodulated lights separated from the unmodulated light LB. Similarly, the optical modulation waveguide performs the coherent modulation for generating the polarized light N4 on the other unmodulated light separated from the unmodulated light LB. That is, the optical modulation element 80 generates two polarized lights N3 and N4 from the unmodulated light LB. The polarized lights N3 and N4 generated by the optical modulation element 80 are respectively output from the optical modulation element 80 via the emission spots 81a and 81b. The polarized light N3 is output from the emission spot 81a. The polarized light N4 is output from the emission spot 81b.

The coupling optical system includes a light multiplexing element 60 and a lens array 70. The lens array 70 is disposed between the optical multiplexing element 60 and the optical modulation element 80. One surface of the lens array 70 faces the light multiplexing element 60, and the other surface of the lens array 70 faces the end face 83 of the optical modulation element 80. The lens array 70 has lenses 71, 72, and 73. The lenses 71, 72, and 73 are arranged in this order in the same direction as an arrangement direction of the emission spot 81a, the unmodulated light incident spot 82, and the emission spot 81b. The lens 71 is disposed on the optical path of the polarized light N3, causes the polarized light N3 to be collimated light before the polarized light N3 is incident on an end face 62 and then emits the collimated light toward the end face 62. The lens 72 is arranged on the optical path of the unmodulated light LB emitted from the end face 62, and focuses the unmodulated light LB on the unmodulated light incident spot 82. The lens 73 is arranged on the optical path of the polarized light N4, causes the polarized light N4 to be collimated light before the polarized light N4 is incident on the end face 62 and then emits the collimated light toward the end face 62. The lens 71 is an example of a fourth collimating lens in the present disclosure. The lens 73 is an example of a fifth collimating lens in the present disclosure.

The optical multiplexing element 60 is disposed at a position on the optical path of the signal light NB and also on the optical path of the unmodulated light LB. The optical multiplexing element 60 includes an end face 61 and the end face 62 on the side opposite to the end face 61. The end face 61 is an example of a first face in the present disclosure. The end face 62 is an example of a second face in the present disclosure. The end face 62 is parallel to the end face 61. For example, an antireflection film is provided on each of the end faces 61 and 62. In the embodiment, a shape of the optical multiplexing element 60 is a rectangular parallelepiped shape which extends in a direction orthogonal to the end faces 61 and 62 as a longitudinal direction thereof. The end face 62 faces the lens array 70. The end face 62 and the end face 83 face each other with the lens array 70 interposed therebetween.

The above-described emission spot 81a of the optical modulation element 80 is optically coupled with an incident spot 60a of the polarized light N3 on the end face 62. The incident spot 60a is an example of a third incident spot in the present disclosure. The unmodulated light incident spot 82 is optically coupled with an emission spot 60c of the unmodulated light LB on the end face 62. The emission spot 60c is an example of an unmodulated light emission spot in the present disclosure. The emission spot 81b is optically coupled with an incident spot 60b of the polarized light N4 on the end face 62. The incident spot 60b is an example of a fourth incident spot in the present disclosure. The polarized lights N3 and N4 are respectively incident on the mutually different incident spots 60a and 60b. The lens 71 causes the polarized light N3 to be collimated light before the polarized light N3 is incident on the end face 62 and then emits the collimated light toward the end face 62. The lens 72 collects the unmodulated light LB emitted from the end face 62. The lens 73 causes the polarized light N4 to be collimated light before the polarized light N4 is incident on the end face 62 and then emits the collimated light toward the end face 62.

Figure 9:
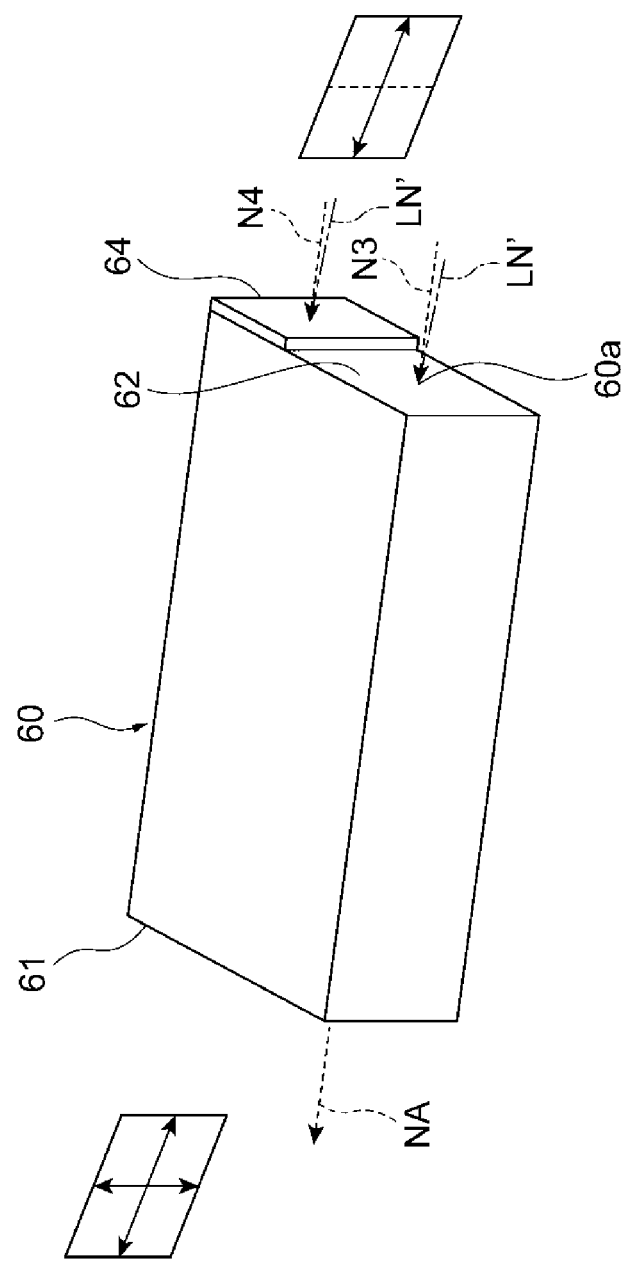
FIG. 9 is a perspective view of an optical multiplexing element shown in FIG. 8.

FIG. 9 is a perspective view of the optical multiplexing element 60 shown in FIG. 8. The optical multiplexing element 60 is disposed so that a normal line LN' of the end face 61 is inclined with respect to the optical axis of the optical modulation element 80 by a slight angle such as 2 degrees. Each of the polarized lights N3 and N4 is incident on the end face 62 at the above-described slight incident angle.

Here, the optical multiplexing element 60 is configured to include a birefringent material, and in one example, is formed of only the birefringent material. The birefringent material has birefringence. Specific examples of the birefringent material include titanium dioxide ($TiO_2$), yttrium vanadate ($YVO_4$), lithium niobate ($LiNbO_3$), calcium carbonate ($CaCo_3$), potassium dihydrogenphosphate ($KH_2PO_4$, abbreviation: KDP), quartz, and the like. The birefringent material includes at least one of titanium dioxide, yttrium vanadate, lithium niobate, calcium carbonate, potassium dihydrogenphosphate, and quartz. The optical multiplexing element 60 utilizes an action of the birefringent material to refract the input polarized lights N3 and N4 at different refraction angles according to directions of the polarized planes thereof and then to emit the refracted lights. That is, the optical multiplexing element 60 refracts a P-polarized wave and an S-polarized wave at refraction angles different from each other. Thus, the optical multiplexing element 60 combines the polarized lights N3 and N4 and generates the signal light NB including the P-polarized wave and the S-polarized wave.

Figure 10:
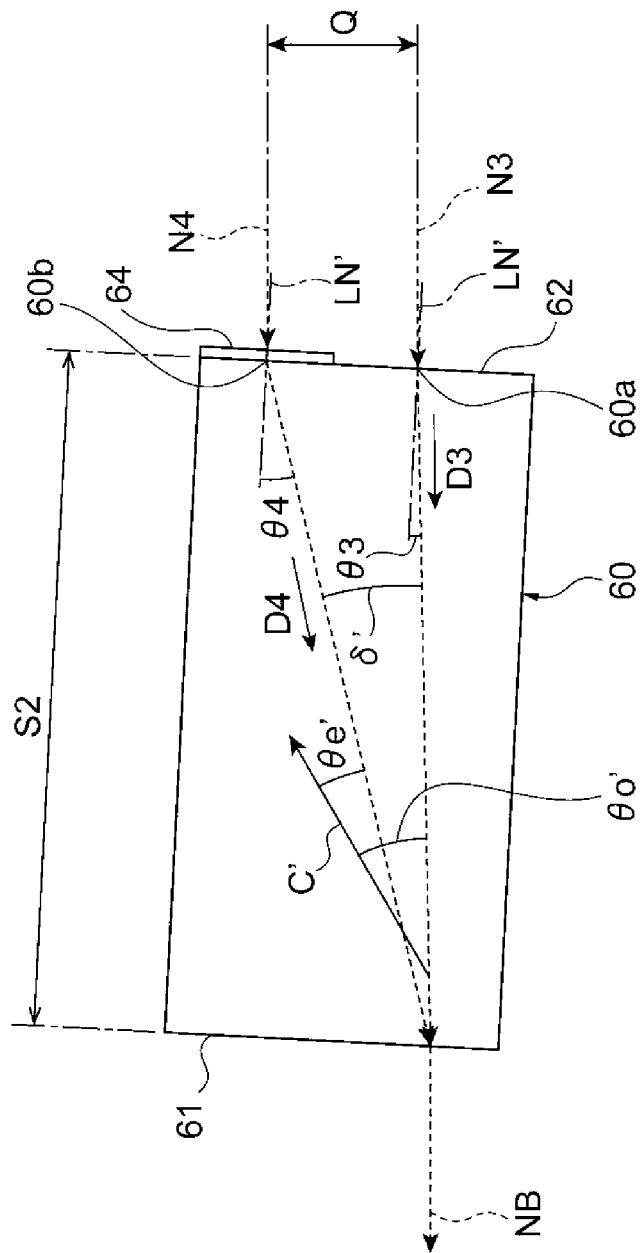
FIG. 10 is a diagram for explaining multiplexing by the optical multiplexing element.

FIG. 10 is a diagram for explaining multiplexing by the optical multiplexing element 60. As shown in FIG. 10, the optical multiplexing element 60 causes the polarized light N3 incident from the end face 62 to be the P-polarized wave and refracts it at a refraction angle θ3. The optical multiplexing element 60 makes the polarized light N3 travel straight toward the end face 61 in a direction D3 and emits the light from the end face 61. The polarized light N4 as the P-polarized wave has been incident on a half-wave plate, that is, a λ/2 plate 64 which will be described later and has been converted into the S-polarized wave. The optical multiplexing element 60 refracts the polarized light N4 as the S-polarized wave at a refraction angle θ4. The refraction angle θ4 is different from the refraction angle θ3 by a combining angle δ'. The optical multiplexing element 60 makes the polarized light N4 travel straight toward the end face 61 in a direction D4 inclined with respect to the direction D3 and emits the polarized light N4 from a position on the end face 62 overlapping the polarized light N3. The direction D3 is an example of a first direction in the present disclosure. The direction D4 is an example of a second direction in the present disclosure.

The polarized lights N3 and N4 are incident from the end face 62 while being apart from each other by a distance Q. The distance Q is the same as a distance between the two emission spots 81a and 81b. The distance between the emission spots 81a and 81b is, for example, 500 μm. A length S2 of the optical multiplexing element 60 in the longitudinal direction is set by the following Equations (4) to (6) on the basis of the distance Q. Here, Equation (4) shows a relationship between the distance Q and the length S2. Equation 5 shows a relationship between an angle θo' and an angle θe'. The angle θo' is formed between a crystal optical axis C' of the optical multiplexing element 60 and the P-polarized wave, that is, an ordinary ray. The angle θe' is formed between the crystal optical axis C' of the optical multiplexing element 60 and the S-polarized wave, that is, an extraordinary ray. $n_o$ is a refractive index of the ordinary ray, and $n_e$ is a refractive index of the extraordinary ray. Expression (5) shows a relationship between the combining angle δ' of the polarized lights N3 and N4 and the angles θo' and θe'.

[Equation 4]

$$P = S2\tan\delta' \quad (4)$$

[Equation 5]

$$\tan\theta'_e = \frac{n_o^2}{n_e^2}\tan\theta'_o \quad (5)$$

[Equation 6]

$$\tan\delta' = \tan(\theta'_o - \theta'_e) \quad (6)$$

In FIG. 10, the angle θo' and the angle θe' are shown. When the angle θo' is within a range of 47 degrees to 49 degrees, the combining angle δ' becomes maximum. Therefore, in the embodiment, an element having the angle θo' within the range of 47 degrees to 49 degrees, for example, 48 degrees is used as the optical multiplexing element 60.

Referring again to FIG. 8, the optical multiplexing element 60 further refracts the unmodulated light LB incident from the end face 61 at the same angle as that of the polarized light N3, that is, at a refraction angle θ3 shown in FIG. 10. The optical multiplexing element 60 makes the unmodulated light LB travel straight toward the end face 62 in a direction directly opposite to the polarized light N3, that is, a direction directly opposite to the direction D3 shown in FIG. 3. The unmodulated light LB is incident on the end face 61 at the same incident angle as that of the polarized lights N3 and N4 incident on the end face 62. The light multiplexing element 60 emits the unmodulated light LB which is incident from the end face 61 from the end face 62 at an emission angle which is the same as the incident angle. The unmodulated light LB is emitted from between the incident spot 60a of the polarized light N3 and the incident spot 60b of the polarized light N4 on the end face 62. The emission spot 60c of the unmodulated light LB on the end face 62 is located, for example, at a midspot between the incident spot 60a and the incident spot 60b.

The half-wave plate, that is, the λ/2 plate 64 is provided on the optical multiplexing element 60 to convert the polarized light N4 incident on the end face 62 into the S-polarized wave. The λ/2 plate 64 is an example of a polarization rotator in the embodiment. The λ/2 plate 64 may be configured of a flat birefringent material such as quartz, for example. As shown in FIG. 8, the λ/2 plate 64 is provided in a partial region of the end face 62 including the incident spot 60b of the polarized light N4. This region does not include the incident spot 60a of the polarized light N3 and the emission spot 60c of the unmodulated light LB. The polarized light N4 passes through the λ/2 plate 64 and is incident on the optical multiplexing element 60. The λ/2 plate 64 rotates the polarized plane of the polarized light N4 by 90 degrees. Therefore, the polarized plane of the polarized light N4 which has passed through the λ/2 plate 64 is orthogonal to the polarized plane of the polarized light N3 and the polarized plane of the unmodulated light LB.

The optical input/output part 50 includes optical fibers 51 and 52 and a lens array 53. The lens array 53 faces the end face 61 of the optical multiplexing element 60. The lens array 53 includes a lens 53a and a lens 53b. The lens 53b is an example of a third collimating lens in the present disclosure. The lenses 53a and 53b are arranged in the same direction as an arrangement direction of the emission spot of the signal light NB and the incident spot of the unmodulated light LB on the end face 61. The lens 53a is optically coupled with the emission spot of the signal light NB on the end face 61. The lens 53b is optically coupled with the incident spot of the unmodulated light LB on the end face 61. The lens 53a collects the signal light NB emitted from the end face 61. The lens 53b causes the unmodulated light LB to be collimated light before the unmodulated light LB is incident on the end face 61 and then emits the collimated light toward the end face 61.

The optical fiber 51 is a single mode fiber and propagates the signal light NB. The optical fiber 52 is a polarization maintaining fiber and propagates the P-polarized unmodulated light LB. The optical fibers 51 and 52 are arranged and disposed in the same direction as an arrangement direction of the lenses 53a and 53b. The optical fibers 51 and 52 extend in the same direction as each other and in a direction intersecting the arrangement direction. An optical axis of the optical fiber 51 is parallel to an optical axis of the optical fiber 52. The lens array 53 is located on one side in the extending direction of the optical fibers 51 and 52 and faces both an end surface of the optical fiber 51 and an end surface of the optical fiber 52. The lens 53a focuses the signal light NB toward the end surface of the optical fiber 51. The lens 53b causes the unmodulated light LB output from the end surface of the optical fiber 52 to be collimated light before the unmodulated light LB is incident on the end face 61. The lens 53b emits the collimated light toward the end face 61.

In this way, the polarized lights N3 and N4 combined by the optical multiplexing element 60 are input to the optical fiber 51 via the lens 53a of the lens array 53 as the signal light NB including the P-polarized wave and the S-polarized wave and are propagated to the outside of the optical modulation module 1B. The optical modulation module 1B configured as described above may include the optical input part 10 included in the optical receiving module 1A according to the first embodiment as the optical input/output part 50. The optical modulation module 1B may include the coupling optical system included in the optical receiving module 1A according to the first embodiment, that is, the optical separating element 20 and the lens array 30 as the coupling optical system, that is, the optical multiplexing element 60 and the lens array 70. In other words, the optical modulation module 1B serves as the optical receiving module 1A by replacing the optical modulation element 80 with the optical hybrid element 40. In other words, the optical separating element 20 can serve as the optical multiplexing element 60, or the optical multiplexing element 60 can serve as the optical separating element 20 according to a propagation direction of light.

Operations and effects of the above-described optical modulation module 1B will be described. In the optical modulation module 1B according to the second embodiment, the optical multiplexing element 60 is formed of a birefringent material. Thus, the polarized lights N3 and N4 which are separately incident on the end face 62 of the optical multiplexing element 60 are refracted at different refraction angles using a difference in the refraction angle of each of the polarization components and are then combined at the end face 61. At this time, the polarized lights N3 and N4 incident from the end face 62 travel without being reflected and are emitted from the end face 61 as the signal light NB. Therefore, the emission angle of the signal light NB from the end face 61 is the same as the respective incident angles of the polarized lights N3 and N4 on the end face 62. Therefore, even if the end faces 61 and 62 are not parallel due to a manufacturing error, when the signal light NB is emitted from the end face 61, the optical path of the polarized light N3 and the optical path of the polarized light N4 are deviated by the same angle with respect to a design value. Further, even if the angle θo' formed by the crystal optical axis C' and the traveling direction of the P-polarized wave deviates from the above-described range due to another manufacturing error, when the signal light NB is emitted from the end face 61, the optical paths of the polarized light N3 and the polarized light N4 are parallel to each other, and only the emission spots on the end face 61 are deviated from the design values. Thus, it is possible to prevent the angle of only one of the polarized light N3 and the polarized light N4 from being largely deviated from the design value. Therefore, it is possible to curb occurrence of a difference in the coupling efficiency between the polarized lights N3 and N4 emitted as the signal light NB.

Figure 11:
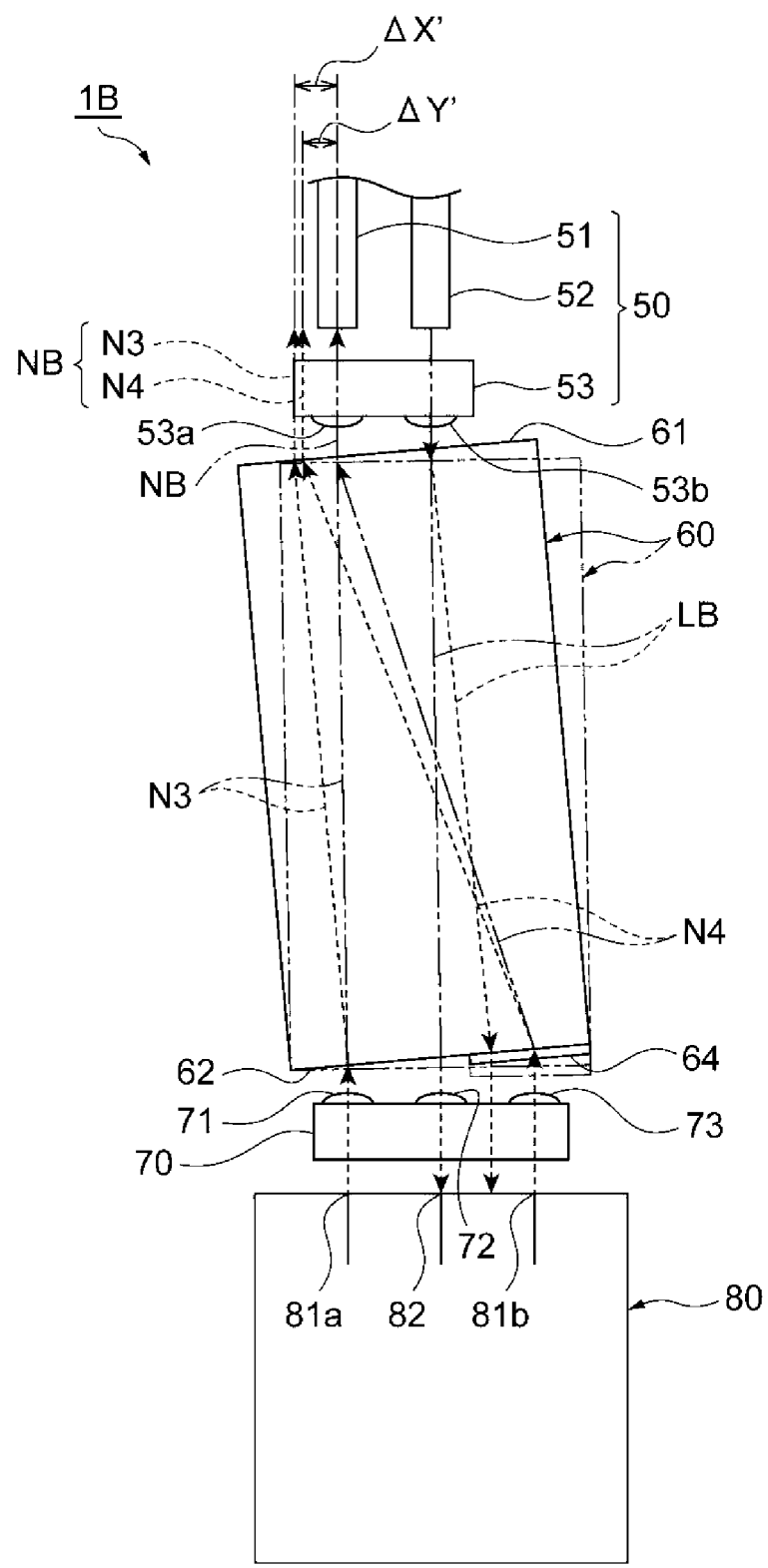
FIG. 11 is a diagram for explaining an optical path in a state in which a mounting angle of the optical multiplexing element is deviated.
Figure 12:
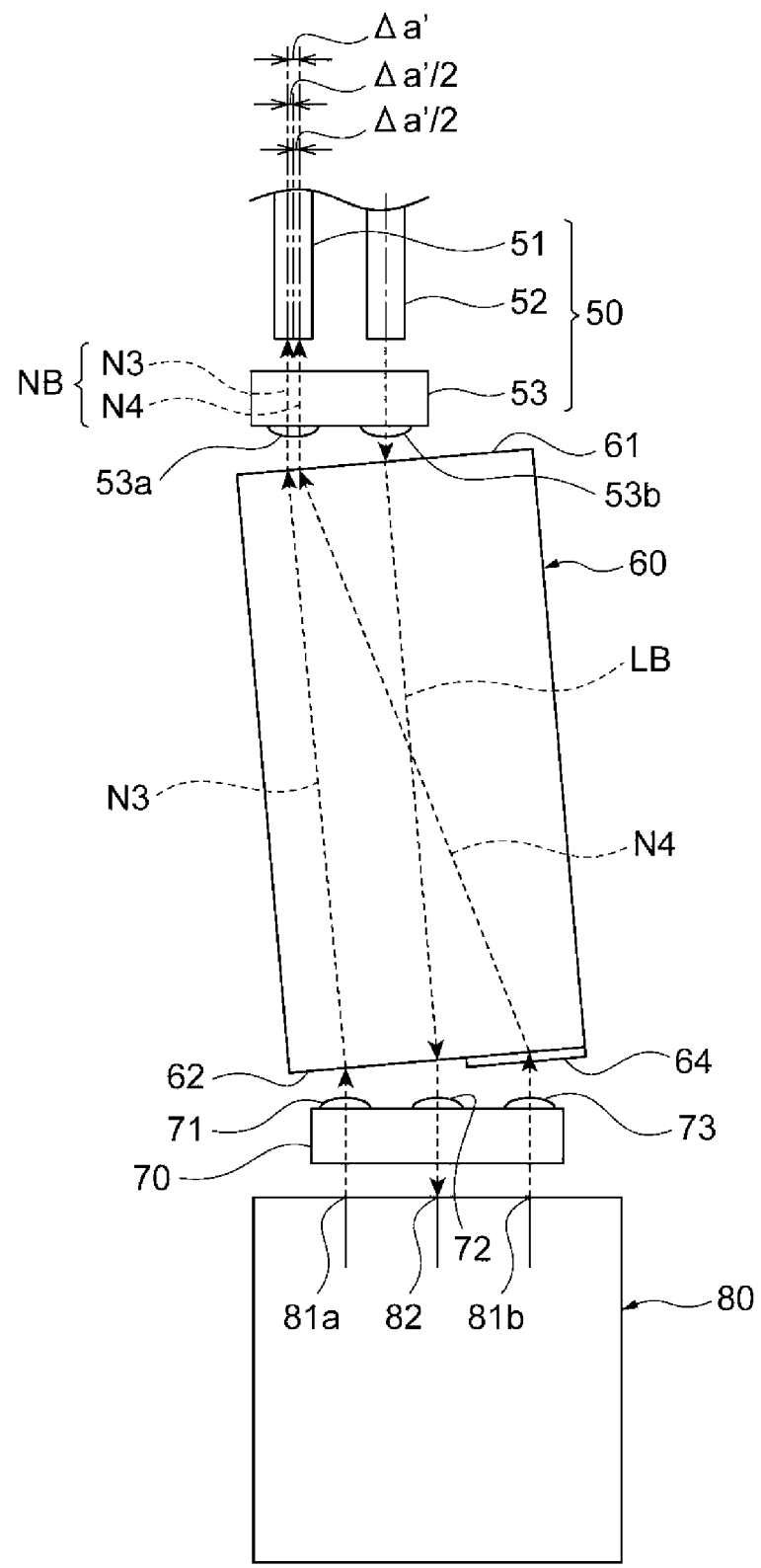
FIG. 12 is a diagram for explaining an optical path in the state in which the mounting angle of the optical multiplexing element is deviated.

FIGS. 11 and 12 are diagrams for explaining the optical path in a state in which a mounting angle of the optical multiplexing element 60 is deviated. In FIG. 11, a state in which the mounting error is zero is indicated by a two-dot chain line. As shown in FIG. 11, it is assumed that a rotation deviation Δθ4 occurs the optical multiplexing element 60 due to a mounting error. In this case, an axis deviation ΔX' occurs between the polarized light N3 and the optical fiber 51, and an axis deviation ΔY' occurs between the polarized light N4 and the optical fiber 51. Even in such a case, a beam interval between the polarized lights N3 and N4 is unlikely to change from the design value. As shown in FIG. 12, as a change in the beam interval of the polarized lights N3 and N4 with respect to the design value, a parallel deviation Δa' which is a difference between the axis deviation ΔX' and the axis deviation ΔY' occurs only slightly. FIG. 12 shows a state in which a parallel deviation Δa' is evenly allocated to the polarized lights N3 and N4 by adjusting optical axes of the optical multiplexing element 60 and the optical fiber 51, that is, a state in which a parallel axis deviation Δa'/2 occurs between the polarized light N3 and the optical axis of the optical fiber 51 and between the polarized light N4 and the optical axis of the optical fiber 51.

As described above, according to the optical modulation module 1B of the second embodiment, even when the mounting angle of the optical multiplexing element 60 is deviated, the beam interval between the polarized lights N3 and N4 emitted as the signal light NB is unlikely to change from the design value. Therefore, a parallel axis deviation Δa'/2 of the polarized lights N3 and N4 with respect to the optical fiber 51 is curbed. Accordingly, in the signal light NB combined by the optical multiplexing element 60, it is possible to make the coupling efficiencies of the polarized lights N3 and N4 uniform and to realize high coupling efficiency.

In the second embodiment, the optical modulation module 1B further includes the lens 53b and the lenses 71 and 73. The lens 53b causes the unmodulated light LB to be collimated light before the unmodulated light LB is incident on the end face 61 and then emits the collimated light toward the end face 61. The lenses 71 and 73 cause the polarized lights N3 and N4 to be collimated lights before the polarized lights N3 and N4 are incident on the end face 62 and then emits the collimated lights toward the end face 62. Thus, the polarized lights N3 and N4 and the unmodulated light LB as the collimated lights can be propagated to the optical multiplexing element 60.

In the optical modulation module 1B according to the second embodiment, the λ/2 plate 64 which converts a phase of the polarized light N4 by 90 degrees is provided in a region of the end face 62 including the incident spot 60b of the polarized light N4. Thus, the polarized plane of the polarized light N4 passing through the optical multiplexing element 60 can be made orthogonal to the polarized plane of the polarized light N3.

The above-described respective embodiments describe one embodiment of the optical module according to the present disclosure. The optical module according to the present disclosure can be obtained by arbitrarily modifying the above-described embodiments.

For example, in the first embodiment, although the example in which the optical separating element 20 is formed of only a birefringent material has been described, at least a portion of the optical separating element 20 through which the signal light NA and the local oscillation light LA pass may be formed of a birefringent material, and at least a part of the other portion may be formed of a material other than the birefringent material. The shape of the optical separating element 20 is not limited to a rectangular parallelepiped shape so far as the optical separating element 20 has the end faces 21 and 22 and extends in a direction orthogonal to the end faces 21 and 22. In the second embodiment, although the example in which the optical multiplexing element 60 is formed of only a birefringent material has been described, at least a portion of the optical multiplexing element 60 through which the polarized lights N3 and N4 and the unmodulated light LB pass may be formed of a birefringent material, and at least a part of the other portion may be formed of a material other than the birefringent material. The shape of the optical multiplexing element 60 is not limited to a rectangular parallelepiped shape so far as the optical multiplexing element 60 has the end faces 61 and 62 and extends in a direction orthogonal to the end faces 61 and 62.

The present disclosure may be applied to an optical module such as a transceiver including the optical receiving module 1A according to the first embodiment and the optical modulation module 1B according to the second embodiment.

What is claimed is:

1. An optical module comprising:
    an optical separating element including a birefringent material, the optical separating element having a first face and a second face, the first face being configured to receive a signal light incident on the first face and a local oscillation (LO) light incident on the first face, the signal light including a first polarized light having a first polarized plane and a second polarized light having a second polarized plane orthogonal to the first polarized plane, the LO light having a third polarized plane parallel to the first polarized plane, the second face being configured to emit the first polarized light and the second polarized light, the first polarized light traveling from the first face to the second face in a first direction and being emitted from a first emission spot on the second face, the second polarized light traveling from the first face to the second face in a second direction inclined with respect to the first direction and being emitted from a second emission spot on the second face, the LO light traveling from the first face to the second face in the first direction and being emitted from a LO light emission spot on the second face, the LO light emission spot being located between the first emission spot and the second emission spot;
    an optical waveguide element having a third face facing the second face of the optical separating element, the third face having a first incident spot, a second incident spot, and a LO light incident spot, the first incident spot being optically coupled with the first emission spot of the second face, the second incident spot being optically coupled with the second emission spot of the second face, the LO light incident spot being optically coupled with the LO light emission spot of the second face, the LO light incident spot being located between the first incident spot and the second incident spot; and
    a polarization rotator provided in a region of the second face of the optical separating element, the region including the second emission spot and excluding the first emission spot and the LO light emission spot, the polarization rotator being configured to rotate the second polarized plane of the second polarized light by 90 degrees.

2. The optical module according to claim 1, further comprising a first collimating lens configured to cause the signal light to be collimated light before the signal light is incident on the first face and to emit the collimated light toward the first face; and a second collimating lens configured to cause the LO light to be collimated light before the LO light is incident on the first face and to emit the collimated light toward the first face.

3. The optical module according to claim 1, wherein the optical separating element has a rectangular parallelepiped shape of which a longitudinal direction is a direction orthogonal to the first face.

4. The optical module according to claim 1, wherein the birefringent material has a uniaxial property.

5. The optical module according to claim 1, wherein the second face is parallel to the first face.

6. An optical module comprising:
    an optical multiplexing element including a birefringent material, the optical multiplexing element having a first face and a second face, the first face being configured to emit a signal light and to receive an unmodulated light, the signal light including a first polarized light having a first polarized plane and a second polarized light having a second polarized plane orthogonal to the first polarized plane, the unmodulated light having a third polarized plane parallel to the first polarized plane, the second face being configured to receive the first polarized light and the second polarized light and to emit the unmodulated light, the first polarized light traveling from a third incident spot on the second face to the first face in a first direction and being emitted from the first face, the second polarized light traveling from a fourth incident spot on the second face to the first face in a second direction inclined with respect to the first direction and being emitted from a position of the first face overlapping the first polarized light, the unmodulated light traveling from the first face to the second face in the first direction and being emitted from an unmodulated light emission spot on the second face, the unmodulated light emission spot being located between the third incident spot and the fourth incident spot;
    an optical modulation element having a third face facing the second face of the optical multiplexing element, the third face having a third emission spot, a fourth emission spot, and an unmodulated light incident spot, the third emission spot being optically coupled with the third incident spot of the second face, the fourth emission spot being optically coupled with the fourth incident spot of the second face, the unmodulated light incident spot being optically coupled with the unmodulated light emission spot of the second face, the unmodulated light incident spot being located between the third emission spot and the fourth emission spot; and
    a polarization rotator provided in a region of the second face of the optical multiplexing element, the region including the fourth incident spot and excluding the third incident spot and the unmodulated light emission spot, the polarization rotator being configured to rotate the second polarized plane of the second polarized light by 90 degrees.

7. The optical module according to claim 6, further comprising a third collimating lens configured to cause the unmodulated light to be collimated light before the unmodulated light is incident on the first face and to emit the collimated light toward the first face, a fourth collimating lens configured to cause the first polarized light to be collimated light before the first polarized light is incident on the second face and to emit the collimated light toward the second face, and a fifth collimator lens configured to cause the second polarized light to be collimated light before the second polarized light is incident on the second face and to emit the collimated light toward the second face.

8. The optical module according to claim 6, wherein the optical multiplexing element has a rectangular parallelepiped shape of which a longitudinal direction is a direction orthogonal to the first face.

9. The optical module according to claim 6, wherein the birefringent material has a uniaxial property.

10. The optical module according to claim 6, wherein the second face is parallel to the first face.

* * * * *